United States Patent [19]
Wical

[11] Patent Number: 5,918,236
[45] Date of Patent: Jun. 29, 1999

[54] POINT OF VIEW GISTS AND GENERIC GISTS IN A DOCUMENT BROWSING SYSTEM

[75] Inventor: Kelly Wical, San Carlos, Calif.

[73] Assignee: Oracle Corporation, Redwood Shores, Calif.

[21] Appl. No.: 08/673,306
[22] Filed: Jun. 28, 1996
[51] Int. Cl.[6] .................................................. G06F 17/21
[52] U.S. Cl. .................................. 707/500; 707/5; 704/1
[58] Field of Search ........................... 704/1, 9; 707/500, 707/501, 513, 514, 515, 531, 4, 5, 526

[56] References Cited

U.S. PATENT DOCUMENTS

| | | | |
|---|---|---|---|
| 5,050,071 | 9/1991 | Harris et al. | 364/200 |
| 5,297,027 | 3/1994 | Morimoto et al. | 364/419.19 |
| 5,634,051 | 5/1997 | Thomson | 395/605 |
| 5,689,716 | 11/1997 | Chen | 395/761 |
| 5,694,523 | 12/1997 | Wical | 395/12 |
| 5,708,822 | 1/1998 | Wical | 395/75 |
| 5,708,825 | 1/1998 | Sotomayor | 364/419.19 |
| 5,754,938 | 5/1998 | Herz et al. | 455/4.2 |
| 5,768,580 | 6/1998 | Wical | 395/613 |
| 5,778,397 | 7/1998 | Kupiec et al. | 707/500 |

Primary Examiner—Joseph H. Feild
Attorney, Agent, or Firm—Fliesler, Dubb, Meyer & Lovejoy LLP

[57] ABSTRACT

A system for generating and displaying point of view and generic gists for use in a document browsing system. Each point of view gist provides a synopsis or abstract that reflects the content of a document from a predetermined point of view or slant. A content processing system analyzes documents to generate a thematic profile for use by the point of view gist processing. The point of view gist processing generates point of view gists based on the different themes or topics contained in a document by identifying paragraphs from the document that include content relating to a theme for which the point of view gist is based. In one embodiment, the user of a document browsing system inputs topics to select a particular point of view gist for a document. A document browsing system may also display point of view gists based on a navigation history of categories selected by a user though use of a document browsing system. In another embodiment, a document browsing system generates and displays generic gists, which include content relating to the document themes.

21 Claims, 15 Drawing Sheets

FIG.2a

Science, Technology, and Education 760
  hard science and technology 540
    electronics 390
      computer industry 270
        computer software industry 200
          operating systems 120
            OS/2 40

300

1: IBM Announces OS/2 Shipping in Spring; Bob Smith, 1994
2: An Introduction to Operating Systems; John Carroll, 1993
3: Around the Computer World in 80 Megabytes; Vernon Julius; 1993
4: OS/2 Takes Multiprocessing Role, Ed Scannell, 1994

As with OS/2 2.1, users with OS/2 for SMP can simultaneously run multiple DOS, Windows and OS/2 applications. IBM officials claimed that even single-tasking DOS applications will benefit because of the way OS/2 uses threads that allow an overlap of system services and applications. They added, however, that 32-bit applications written specifically for OS/2 will run significantly faster.

IBM plans to ship OS/2 for SMP by the end of summer with a suggested retail price of $395 for a one- or two-processor version and $595 for a version that handles between one and seven processors. The version for up to 16 processors is priced at $795.

5: Navigating the Crowded Operating System Market; Jane Westin, 1995
6: OS/2 Delays are Source of Concern for Users; Leslie Nelson, 1994

310

320

320

Point of View Gist
270

FIG.2b

Science, Technology, and Education 760
hard science and technology 540
electronics 390
computer industry 270
International Business Machines Corporation 21

300

1: IBM Announces Record Fourth Quarter Revenues; Kent Sehy, 1994
2: IBM in the Trenches; Warren Peese, 1995
3: IBM Announces OS/2 Shipping in Spring; Bob Smith, 1994
4: An Introduction to Operating Systems; John Carroll, 1993
5: IBM Announces Corporate Restructuring; Will Ihtwerk, 1995
6: Around the Computer World in 80 Megabytes; Vernon Julius; 1993
7: OS/2 Takes Multiprocessing Role, Ed Scannell, 1994

> With more than a year of beta testing in its rear-view mirror, IBM finally announced OS/2 for Symmetrical Multiprocessing last week, picking up support from a handful of Intel Corp.-based hardware suppliers along the way.
>
> IBM plans to ship OS/2 for SMP by the end of summer with a suggested retail price of $395 for a one- or two-processor version and $595 for a version that handles between one and seven processors. The version for up to 16 processors is priced at $795.

8: Navigating the Crowded Operating System Market; Jane Westin, 1995
9: OS/2 Delays are Source of Concern for Users; Leslie Nelson, 1994
10: Clash of the Titans, Windows vs. OS/2; Joan Offarck, 1995
11: Donkey Kong Goes IBM; Nina Tendo, 1995

310

320

320

Point of View Gist
270

POINT OF VIEW GISTS AND GENERIC GISTS IN A DOCUMENT BROWSING SYSTEM

BACKGROUND OF THE INVENTION

1. Field of the Invention

The present invention is directed toward the field of document browsing systems, and more particularly to generating and displaying point of view gists of documents.

2. Art Background

A general purpose document browsing system operates in conjunction with a database or repository of source information. For example, a document browsing system may operate in conjunction with a repository that includes documents such as books, magazines, journals, etc. In general, the document browsing system permits a user to browse and access the repository to selectively retrieve documents, books, magazines, etc. available in the repository. Computers have increased the use of document browsing systems because a computer may access a database or repository of information from a remote location. The utility of a document browsing system is to permit a user to view one or more documents in the repository of information.

Prior art document browsing systems provide a number of functions for viewing and manipulating documents entered into the system. For example, the document browsing system may permit a user to view a list of documents available within the system. From the list, a user may choose to view the full text of the document. The full text of the document may be long and require a substantial investment of time for the user to read the entire document. Because of this, some prior art document browsing systems include abstract functions. In general, the abstract functions display, when invoked, an abstract of a selected document. The reader is then permitted to read the abstract to determine whether the user desires to view the entire document.

Typically, abstract functions in prior art document browsing systems attempt to provide an overview of a few topics contained in the corresponding document. However, a document typically includes one or more general topics and several subtopics that expand upon the high level topic. For example, an article about software may contain information about the computer industry, marketing of software, hardware platforms that run the software, etc. Because a document may contain many topics or subtopics, two different users may have different interests in the same document. For the example software article, a marketing professional in the software industry may be interested in the marketing aspects of the article, while a software engineer may be interested in the technical information contained within the article. Because prior art general purpose abstracts provide an overview of one or a few topics included in the document, the lack of attention to a particular area of interest may render the abstract useless for a user (e.g. the user still cannot tell from reading the abstract whether the document is useful for the users purpose). Therefore, it is desirable to develop a system that generates and displays abstracts slanted toward a point of view guided by the user.

SUMMARY OF THE INVENTION

Point of view gists are generated and displayed for use in a document browsing system. In general, each point of view gist is a synopsis or abstract that reflects the content of a document from a predetermined point of view or slant. Typically, a document contains several themes or topics, including sub-topics which relate to other topics, that constitute the content of the document. The point of view gist processing generates point of view gists based on the different themes or topics contained in a document. A user may view a point of view gist of a document that contains the topics of interest for the particular user.

To generate the different point of view gists, a content processing system analyzes documents to generate a thematic profile, including identifying document themes. The document themes specify the overall content of the document. The point of view gist processing utilizes the thematic profile, including the document themes, to generate the point of view gists. In one embodiment, the point of view gists consist of one or more paragraphs from the document that include content relating to a document theme for which the point of view gist is based.

In one embodiment, the content processing system analyzes paragraphs in the document to identify paragraph themes for each paragraph, and analyzes the document as a whole to identify the document themes. The point of view gist processing generates point of view gists for different document themes by relevance ranking paragraphs that contain a paragraph theme corresponding to the document theme.

In one embodiment, the user of a document browsing system inputs information to select a particular point of view gist for a document. For this embodiment, the user inputs one or more topics that define general subject matter areas of interest to generate a user profile for that user. Through use of a document browsing system, a user selects a document and a point of view gist function, and the point of view gist processing selects, for display, a point of view gist that includes one or more document theme relating to one or more topics in the user profile. Thus, the user views a point of view gist that reflects a topic of interest for the user. In one embodiment, to relate point of view gists to topics in the user profile, a knowledge catalog is used to match, when possible, the closest point of view gist to a topic in the user profile.

A document browsing system may also display point of view gists based on a navigation history of a user. For this embodiment, the document browsing system stores a classification hierarchy that includes a plurality of categories. The documents available in the document browsing system are classified in one or more categories. The document browsing system permits a user to navigate or select, using a search retrieval paradigm, the categories of the classification hierarchy including displaying a portion of the classification hierarchy that includes categories for which at least one document has been classified. When a user selects a document and a point of view gist function, the point of view gist processing selects a point of view gist that includes a document theme classified under a category within the portion of the classification hierarchy navigated by the user.

Generic gists are also generated and displayed in a document browsing system. The content processing system generates a thematic profile for a document that includes an identification of document themes. Generic gist processing generates generic gists for the document by selecting paragraphs from the document that include content relating to the document themes. In a document browsing system, the generic gists are displayed in response to user input.

To compile generic gists, the generic gist processing receives user input that specifies generic gist parameters including size and thematic content. In one embodiment, the generic gist processing, through use of the generic gist parameters, selects one or more paragraphs that include different document themes to provide a global perspective of the content of the document. In a second embodiment, the generic gist processing compiles generic gists by selecting one or more of the most important paragraphs. A third embodiment for generic gist processing selects a paragraph that contains content for each document theme identified, and a fourth embodiment for generic gist processing selects paragraphs that contain content in proportion to the overall content of the document.

BRIEF DESCRIPTION OF THE DRAWINGS

FIG. 2a illustrates an example point of view display for a document browsing system.

FIG. 2b illustrates another example point of view display for a document browsing system.

DETAILED DESCRIPTION OF THE PREFERRED EMBODIMENTS

Point of View Gists

Point of view gist processing generates point of view gists, and selects point of view gists for display based on individual interests of users or navigation or search methods in a document browsing system. In general, a point of view gist or abstract is a brief synopsis of a document from a predetermined point of view. A document may contain one or more high level or general themes. However, in addition to the general themes, a document typically covers several sub-themes that relate to the general themes. Two different users viewing the same document may be interested in two different themes. To accommodate the particular needs of a user, the point of view gist processing of the present invention provides different point of view gists depending upon the focus of the user.

An example article, entitled "OS/2 Takes Multiprocessing Role", is generally about the OS/2 operating system. However, the "OS/2 Takes Multiprocessing Role" article may also include subthemes about the marketing of the OS/2 operating system, as well as the company developing the OS/2 operating system, International Business Machines Corporation. For this example, a first user may desire to view a point of view gist for the "OS/2 Takes Multiprocessing Role" article with a marketing slant, while a second user may desire to view a point of view gist for the "OS/2 Takes Multiprocessing Role" article with a corporate slant.

Figure 1:
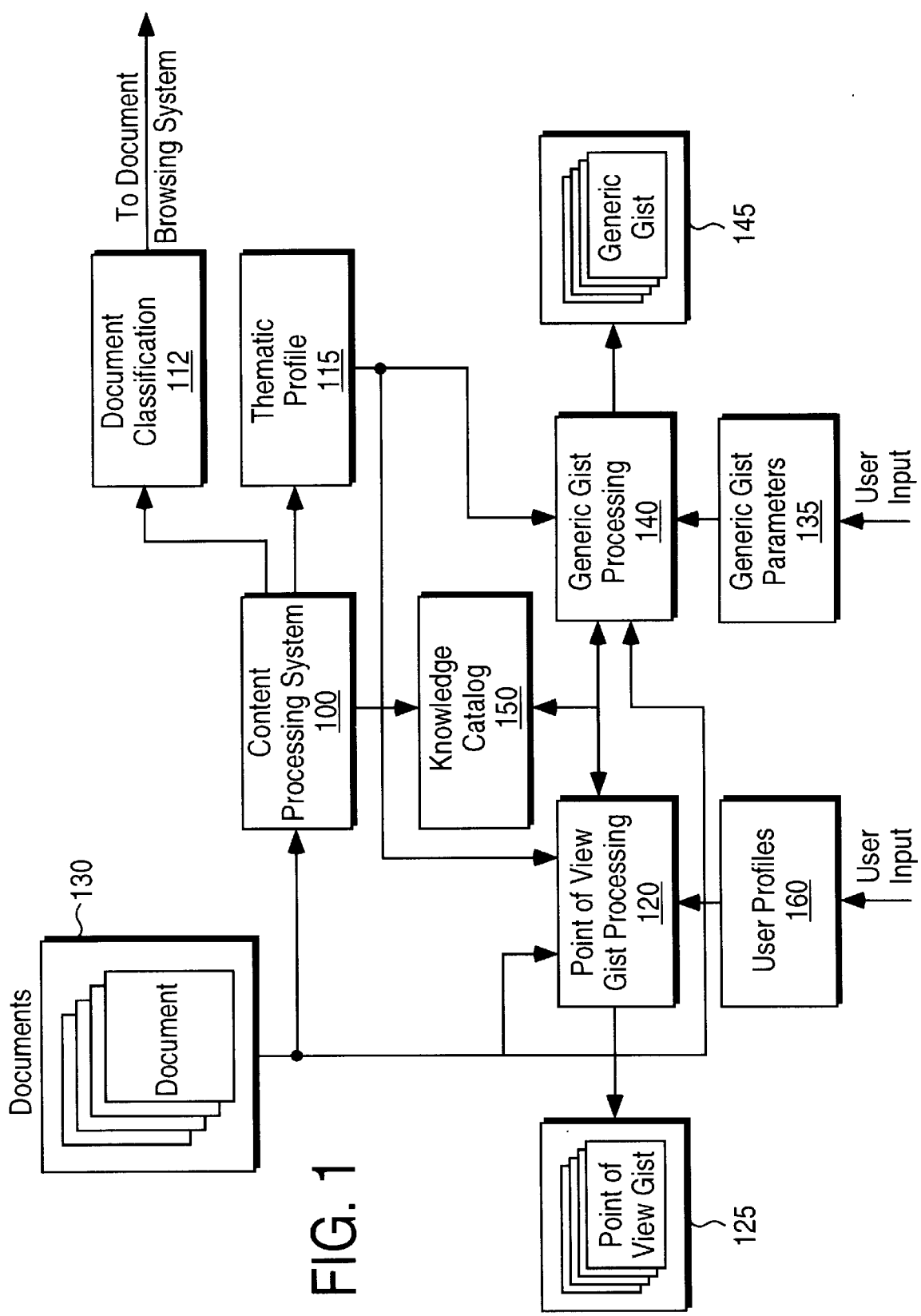
FIG. 1 is a block diagram illustrating one embodiment for processing point of view gists.

FIG. 1 is a block diagram illustrating one embodiment for processing point of view gists. In general, the point of view gists are generated from one or more documents, labeled documents 130 on FIG. 1. The documents 130 may include a compilation of source information from any source. For example, the documents 130 may be information stored on a computer system as computer readable text. Also, the documents 130 may be accessed, via a network, and stored at one or more remote locations. The content of the documents 130 may include articles, books, periodicals, etc. As shown in FIG. 1, point of view gist processing 120 receives one or more documents 130, and generates, for each document analyzed, one or more point of view gists. The point of view gists generated are labeled as point of view gists 125 in FIG. 1.

In one embodiment, the point of view gist processing 120 operates in conjunction with a content processing system 100. In general, content processing system 100 analyzes the documents 130, and generates a thematic profile 115. The thematic profile 115 identifies the thematic content in the individual paragraphs as well as the thematic content in the document as a whole (e.g. identifies the content conveyed by the documents 130). Specifically, the thematic profile 115 identifies paragraph themes, for the individual paragraphs, and document themes for the document as a whole. The content processing system 100 uses a classification hierarchy, which includes categories arranged in a hierarchical structure, to classify documents in one or more categories of the classification hierarchy. To classify documents, the content processing system 100 maps document themes to categories of the classification hierarchy. The documents classified by the content processing system 100 are stored as a document classification profile 112. As discussed more fully below, the document classification 112 is used to present documents in a document browsing system.

In one embodiment, the content processing system 100 uses a knowledge catalog 150 to identify categories for the document themes. For this embodiment, the knowledge catalog 150 contains categories, arranged in a hierarchy, that reflect a world view of knowledge. A more detailed description of a knowledge catalog is described below in the section "The Knowledge Catalog." Also, Appendix A of U.S. patent application Ser. No. 08/455,484, inventor Kelly Wical, entitled "Method and Apparatus for Determining Theme for Discourse", filed May 31, 1995, which is herein expressly incorporated by reference, is an example of a knowledge catalog for use in classifying documents. Although the present invention is described in conjunction with a knowledge catalog used to classify documents, any classification structure that identifies topics or themes may be used in conjunction with the present invention without deviating from the spirit or scope of the invention. A content processing system for use with the point of view gist processing 120 and generic gist processing 140 is described more fully below in the section entitled "A Content Processing System." Although the present invention is described in conjunction with a content processing system that analyzes documents to provide a rich and comprehensive thematic profile of the documents, any content processing system that identifies topics or themes may be used in conjunction with point of view gist processing and generic gist processing without deviating from the spirit or scope of the invention.

The block diagram of FIG. 1 further includes user profiles 160 and navigation history 150. For this embodiment, the user profiles 160 define areas or topics of interest for one or more users of a document browsing system. For example, user profiles may identify topics, such as computer programming or marketing, that are of special interest to the user of the document browsing system. The topics in the user profiles 160 are used by the point of view gist processing 120 to select a point of view gist for a selected document from a plurality of point of view gists generated for the selected document. When a user invokes the point of view gist function for a selected document, the user profiles 160 are used to identify the area of interest for the current user. For example, if the area of interest for a user is economics, then a point of view gist for a document, which focuses on economics, is retrieved from the point of view gists 125. For this example, the selected document is classified under the general category economics such that the document contains document themes about economics. As described below, the navigation history 150 specifies a path of categories traversed in a classification hierarchy to locate a document.

The block diagram of FIG. 1 also includes generic gist processing 140 to generate generic gists 145. In general, the generic gists 145 of the present invention, which are compiled from one or more documents 130, are designed to replace documents such that the user may read a generic gist for a document to obtain the overall content of the document. To generate the generic gists 145, generic gist processing 140 utilizes the thematic profile 115 and generic gist parameters 135 to identify paragraphs contained in the documents 130. The generic gist parameters 135 are specified through user input For example, in one embodiment, during an initialization or configuration of the software, a user specifies the generic gist parameters 135. In general, the generic gist parameters 135 dictate the criteria and formulas used to compile the generic gists 145. The processes performed in the generic gist processing 140 is described more fully below in the section entitled "Generic Gists."

Point of view gists and generic gists have application for use in document browsing systems. In general, a document browsing system provides a user a means to browse, locate and view information contained in a set of documents. In one embodiment, documents are classified in categories of a classification hierarchy through use of the document classification profile 112. A user of the document browsing system may browse through the categories of the classification hierarchy to learn the general topics or themes contained in the documents. The user is permitted to select a particular category of the classification hierarchy, and in response, the document browsing system displays document information about documents classified in the category selected. During operation of the document browsing system, a portion of the classification hierarchy, for which documents have been classified, is interactively displayed to a user. To use point of view gists in a document browsing system, the document browsing system permits user selection of a point of view gist function. In another embodiment, the point of view gist function, which displays point of view gists, is automatically invoked in the user interface portion of the document browsing system based on predetermined conditions. When a user selects a document and the point of view gist function is invoked, the point of view gist processing 120 extracts the point of view gist based on pre-determined criteria, such as the navigation path or the user profile. Similarly, to use generic gists in a document browsing system, the document browsing system permits user selection of a generic gist function. When a user selects a document and the generic gist function is invoked, the generic gist processing 145 extracts or generates on the fly a generic gist based on the generic gist parameter 135.

FIG. 2a illustrates an example display for a document browsing system that implements the point of view gists of the present invention As shown in FIG. 2a, the display for the document browsing system includes a history section 300 and a navigation/document display section 310. In general, for this embodiment of a display of a document browsing system, the history section 300 includes a list of the categories, arranged in a hierarchical path, for which the user either selected to navigate to the current category or queried for automatic positioning to the current category. For the example shown in FIG. 2a, the hierarchical path of categories include "Science, Technology and Education", "Hard Science and Technology", "Electronics", "Computer Industry", "Computer Software Industry", "Operating Systems", and "OS/2." The current category for this example is "OS/2." The navigation/document section 310 includes, for this example, a plurality of documents classified under the "OS/2 " category. The example display shown in FIG. 2a also includes a point of view gist button 270 to invoke the point of view gist function. For a further explanation of one embodiment for a document browsing system, see the section below entitled "A Document Browsing System."

The display of FIG. 2a also illustrates a point of view gist with a slant for the document theme "OS/2." For this example, the document "OS/2 Takes Multiprocessing Role", classified in the OS/2 category, is selected from the navigation/document section 310, and the point of view gist button 270 is pressed. In response, the document browsing system, operating in conjunction with the point of view gist processing, displays a brief synopsis or gist directly beneath the listing of the selected document, "OS/2 Takes Multiprocessing Role." The content of the point of view gist displayed focuses on OS/2 themes from the document (e.g. the point of view gist is about the OS/2 operating system).

FIG. 2b illustrates an example display for a document browsing system that includes a point of view gist for the document "OS/2 Takes Multiprocessing Role" with an International Business Machines Corporation slant. For this example, the document "OS/2 Takes Multiprocessing Role", classified in the International Business Machines Corporation category, is selected, and the point of view gist button 270 is pressed. In response, the document browsing system, operating in conjunction with the point of view gist processing, displays a point of view gist that discloses IBM's operations concerning the OS/2 operating system. Thus, as illustrated in FIGS. 2a and 2b, two different point of view gists or abstracts may be displayed for a single document (e.g. the display of FIG. 2a focuses on the OS/2 operating system, and the display of FIG. 2b focuses on IBM's operations concerning the OS/2 operating system).

In a navigation history embodiment for selecting a point of view gist, the point of view gist selected for a user is dependent upon the classification hierarchy path navigated by the user (e.g. the current category). As shown in FIGS. 2a and 2b, the slant or point of view gists are based on the current category from which the list of documents are classified. For example, in FIG. 2a, the current category, "OS/2", and the selected document, "OS/2 Takes Multiprocessing Role", result in display of a point of view gist focusing on the OS/2 operating system. In FIG. 2b, the user navigated down into the classification hierarchy to the current category "International Business Machines Corporation", and therefore the point of view gist for the selected document "OS/2 Takes Multiprocessing Role" is displayed with an IBM slant. Thus, for the navigation history embodiment, if a user invokes the point of view gist function for a selected document in a current category, then the point of view gist displayed reflects the point of view of the current category.

As an alternative to selecting the point of view gist from the navigation history, the user may pre-set one or more topics in the user profile 160 (FIG. 1). The information for the user profile 160 may be entered through any well known means. For example, an initialization or set-up routine may be executed to prompt a user or system administrator for topics. The topics pre-set in the user profile 160 indicate subject matter of interest for a user to reflect the point of view for which the user desires to view gists. In one embodiment for user profiles, the user profiles 160 permit a user to set a point of view gist configuration table. Table 1 illustrates the contents of an example point of view gist configuration table.

TABLE 1

| User | Topics | |
|---|---|---|
| User 1 | Marketing | France |
| User 2 | Computers | Food |
| User 3 | Legal | Sports |
| . | . | . |
| . | . | . |
| . | . | . |
| User n | Management | Entertainment |

For the example shown in Table 1, a number of users are listed in the first column. For each user, there is listed, in columns two and three, one or more high level topics of interest for that user. For examples user "1" may be a marketing professional and desire to view point of view gists with a marketing slant. User "2", a software engineer, may desire to view point of view gists of documents with a technical computer slant. A third user, user "3", may be a corporate attorney and may desire to view documents with a legal slant, and user "4", a manager, may desire to view documents with management slant. For these user profiles, a different point of view gist for a single document, which includes themes about marketing, software, law, and management, may be viewed by each user with a different interest.

The user, to pre-set the user profiles, only specifies a general area or high level topic of interest. The point of view gist processing relates these topics, through use of the classification hierarchy (e.g. the knowledge catalog), to a current category for a selected document. For the examples shown in FIGS. 2a and 2b, if a user specifies "corporations" or "organizations" as a topic of interest, then the point of view gist processing, through use of the knowledge catalog, determines that the category "IBM" is classified under the higher level category "corporations." For this example, when the point of view gist function is invoked for the selected "OS/2 Takes Multiprocessing Role" document, then the point of view gist processing uses the "corporations" topic to map the corporations category to the IBM category in the classification hierarchy. Then, as described more fully below, the point of view gist processing extracts, from a point of view gist array (Table 2), the point of view gist with the IBM slant (e.g. the point of view slant that contains document themes on IBM). Alternatively, if a user profile stores a topic relating to software, then the point of view gist processing determines that OS/2, a document theme for the selected document, is classified under categories relating to the topic, computer software, and generates the point of view gist with the OS/2 slant as shown in FIG. 2a. Thus, a classification hierarchy, such as the knowledge catalog, is used to relate or map topics to categories and theme documents. The mappings of topics to categories and document themes is described more fully below in conjunction with the example illustrated in FIG. 5.

As shown in Table 1, a user may pre-set more than one topic in the point of view gist configuration table. For example, the marketing professional, user "1", may have an interest in travel, particularly focusing on travel to France. Similarly, user "2", the software engineer, may have an interest in cooking and restaurants. When several topics are listed for a single user, the point of view gist processing uses the topic that relates best to the current category for which the selected document is classified.

Figure 3:
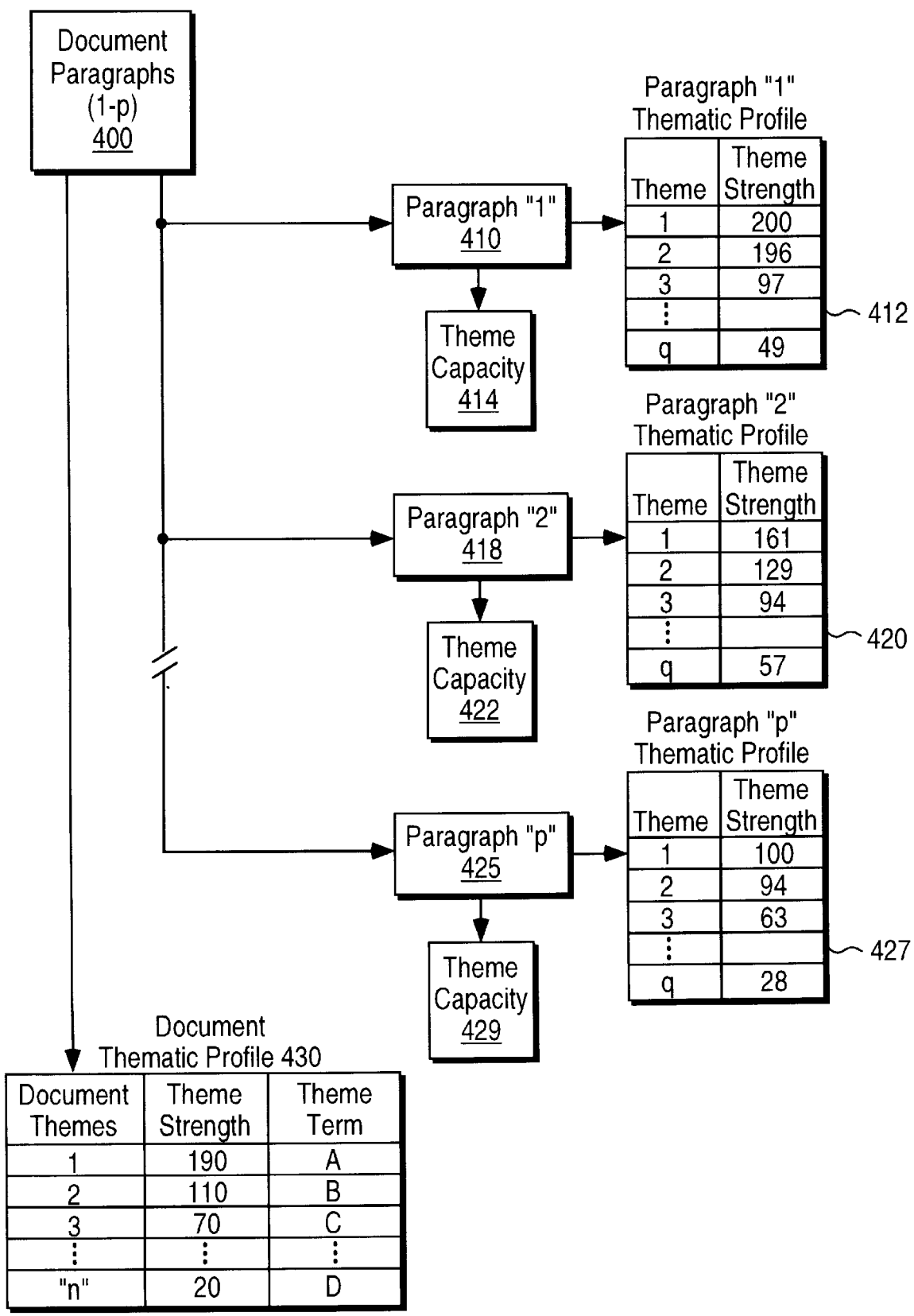
FIG. 3 illustrates generation of paragraph thematic profiles for individual paragraphs as well as document thematic profiles for the document as a whole.

The content processing system 100 (FIG. 1) generates the thematic profile 115, including paragraph thematic profiles and document thematic profiles. FIG. 3 depicts generating paragraph thematic profiles for individual paragraphs as well as document thematic profiles for the document as a whole. A document 400, which contains "p" paragraphs, is divided out into the "p" individual paragraphs (e.g. paragraph "1" 410, paragraph "2" 418, and paragraph "p" 425). As shown in FIG. 3, for paragraph "1" 410, paragraph "2" 418, and paragraph "p" 425, a paragraph thematic profile 412, 420, and 427 is generated, respectively. Also, for each paragraph, a theme capacity is calculated (e.g. theme capacity 414 for paragraph "1" 410, theme capacity 422 for paragraph "2" 418, and theme capacity 429 for paragraph "p" 425). In general, the paragraph thematic profile identifies the most important themes or topics contained in that paragraph. The paragraph thematic profile only reflects the content (e.g. themes) identified in that paragraph. A list of one or more paragraph themes, 1-q, is shown in the first column of each paragraph thematic profile (e.g. paragraph thematic profile 412, 418, and 427 in FIG. 3).

For each paragraph theme, a theme strength or theme weight is calculated. The theme strength measures content of an individual theme. Example theme strengths are shown in the second column of each paragraph thematic profile (e.g. paragraph thematic profile 412, 420, and 427). The theme strengths quantify the strength or importance of a corresponding paragraph theme relative to other paragraph themes. Thus, the theme strength is a relative measure of paragraph theme importance to other paragraph themes. The paragraph themes are ordered in the paragraph thematic profiles (412, 422 and 427) based on the relative theme strengths, (e.g. the most important paragraph theme, which has the largest theme strength, is listed as theme number 1, and the least important theme, which has the smallest theme strength, is listed as theme "q"). In one embodiment, the sixteen most important paragraph themes are identified in a paragraph thematic profile.

The theme capacity (e.g. theme capacities 414, 422, and 429), expressed as a quantitative value, measures the content value of the paragraph as a whole. The theme capacity is a relative measure such that a theme capacity value is a relative comparison with other paragraphs in the document. The theme capacity for a paragraph often depends upon the writing style. For example, a large paragraph, which includes superfluous language, may convey little content, whereas a small paragraph, written to convey information in a very precise manner, may have more content than the large paragraph. For this example, the small paragraph may have a greater theme capacity value than the large paragraph. Conversely, for similar styles of writing, a large paragraph may convey more thematic content than a smaller or shorter paragraph. As discussed below, the theme capacity for paragraphs is used to normalize theme strengths from different paragraphs to relevance rank paragraphs.

In one embodiment, the document thematic profile includes a list of themes, listed in order of importance, that define the content of the document. As shown in FIG. 3, a document thematic profile 430 contains the "n" most important document themes contained in the corresponding document 400. In addition, the document thematic profile 430 includes an overall theme strength, for each corresponding theme, that reflects the importance of the document theme in the overall content of the document. In one embodiment, the document thematic profile 430 contains the sixteen most important document themes (e.g. n=16).

Figure 4:
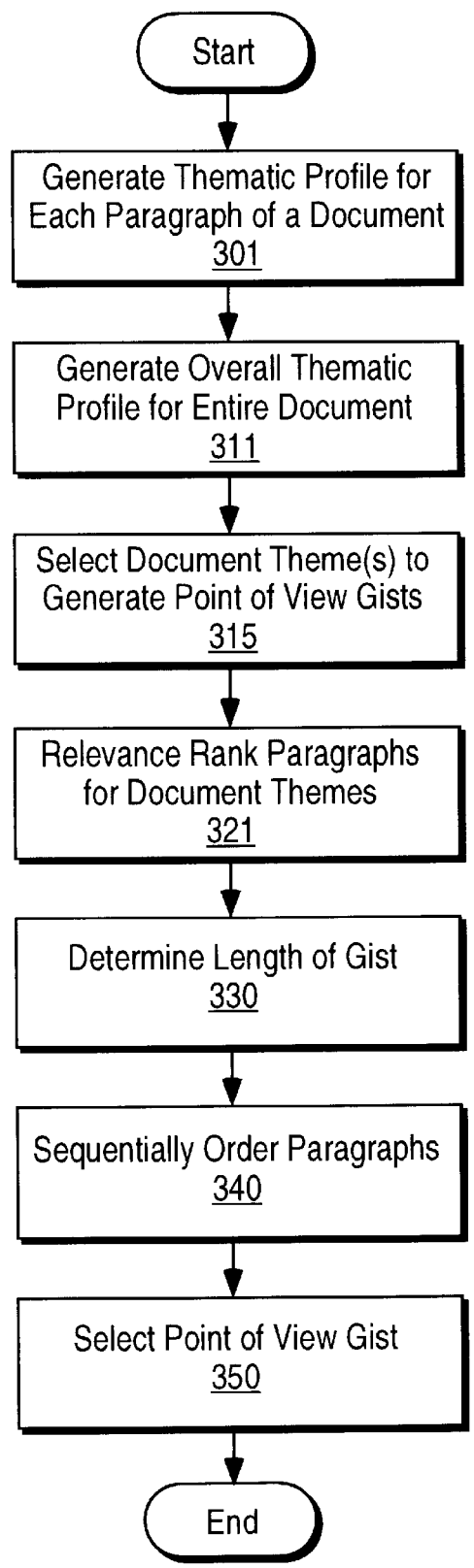
FIG. 4 is a flow diagram illustrating one embodiment for generating point of view gists.

FIG. 4 is a flow diagram illustrating one embodiment for generating point of view gists. As shown in block 301 of FIG. 4, for this embodiment, thematic profiles for each paragraph of the document are generated. As shown in block 311, the document thematic profile for an entire document is generated. The document thematic profile identifies themes that best characterize or reflect the content of the document as a whole. As shown in block 315, the point of view gist processing, using the document thematic profile, selects areas to generate point of view gists. For example, the point of view gist may select the sixteen most important document themes, and generate sixteen point of view gists based on each of the document themes.

The point of view gist processing, using the paragraph thematic profiles, relevance ranks the paragraphs for the document themes as shown in block 321 of FIG. 4. The point of view gist processing compiles a point of view gist array for each document theme selected for which a point of view gist is generated. Table 2 depicts a point of view gist array for generating point of view gists.

TABLE 2

| | Paragraphs (In Order of Importance) | | | | | |
|---|---|---|---|---|---|---|
| Document Themes | 1 | 2 | 3 | 4 | 5 | m |
| Document Theme 1 | 37 | 16 | 19 | 12 | 1 | ... |
| Document Theme 2 | 12 | 14 | 2 | 7 | | ... |
| Document Theme 3 | 21 | 19 | 16 | 29 | 13 | ... 4 |
| . | | | | | | ... |
| . | | | | | | |
| . | | | | | | |
| Document Theme n | 36 | 8 | 11 | 12 | 13 | ... 6 |

The first column, entitled document themes. lists the most important themes extracted from the document thematic profile (e.g. document thematic profile 430 of FIG. 3). In one embodiment, the point of view gist array contains sixteen of the strongest document themes (e.g. n equals 16). The point of view gist array shown in Table 2 also includes columns, ranging from 1-m, to relevance rank "m" paragraphs of the document for each corresponding document theme. In one embodiment, the point of view gist processing selects ten paragraphs most relevant to the document theme (e.g. m equals ten). The example shown in Table 2 identifies paragraph "36" as containing the strongest and most relevant content for document theme "in." Similarly, paragraphs are relevance ranked, from left to right, for each corresponding document theme. For example, for document theme 1, the strongest thematic content is located in paragraph 37, the second strongest content is in paragraph 16, the third strongest in paragraph 19, etc.

In one embodiment, to relevance rank paragraphs for a document theme, the point of view gist processing determines whether a paragraph, as identified in the paragraph thematic profiles, conveys the document theme in question. The point of view gist processing traverses all of the paragraph theme profiles in a document to identify, for each document theme, the paragraphs that convey that theme. For all of the paragraphs that contain the theme in question, the point of view gist processing relevance ranks the paragraphs to populate the point of view gist array. In one embodiment, the point of view gist processing uses the theme weight and theme capacity of paragraphs to relevance rank the paragraphs. Specifically, a ranking value is generated for each paragraph by multiplying the theme strength (TS), for the corresponding document theme, and the theme capacity (TC) of the paragraph (i.e. TS×TC). To relevance rank two paragraphs, the ranking values are compared and the strongest and most relevant paragraph has the greatest ranking value. In this manner, the ranking value of all paragraphs, which identify the document theme in question, are relevance ranked to generate a list of the most relevant paragraphs for a document theme.

A paragraph theme, as identified in a paragraph thematic profile, may not manifest itself as a document theme. For example, paragraph "1", which has a relatively low theme capacity, may include a theme about subject matter "X" with a relatively weak theme strength. If the theme "X" was only found in paragraph 1, then the theme probably will not appear as one of the "n" document themes identified in the document thematic profile. For this example, theme X is not processed, and no point of view gist is generated based on this theme.

As shown in block 330 of FIG. 4, the point of view gist processing determines the length of a point of view gist. If the point of view gist array includes ten of the most important and relevant paragraphs for a theme, then the user may select from one to ten paragraphs to define the length of the point of view gists. In one embodiment, the length of a point of view gist may be set by a user as an initialization or configuration parameter. For example, the point of view gist length may be set at a single paragraph. For this embodiment, the point of view gist processing selects the highest ranking paragraph for the corresponding theme. Alternatively, any number of paragraphs may be specified.

As shown in block 340 of FIG. 4, the paragraphs, identified in the point of view gist array for a document theme, are sequentially ordered for each document theme so that the paragraphs appear in the original order of the document. For the example shown in the point of view gist array of Table 2, a point of view gist for theme 1, which includes three paragraphs, consists of paragraph 16 as the first paragraph, paragraph 19 as the second paragraph, and paragraph 37 as the final paragraph of the point of view gist. The point of view processing selects, based on the predetermined selection criteria discussed above (e.g. user profiles and navigation history), a point of view gist corresponding to a document theme as shown in block 350 of FIG. 4.

The following example is based on an analysis of a document about the wine industry. The example document includes material about Napa Valley, Calif., a leading wine producing region. In addition to the geographical information, the document includes agricultural information, such as information on vineyards as well as information on harvesting the grapes for wine production. The document includes information about a specific type of grape and varietal wine, Merlot. Furthermore, the article includes information about the financial aspects of wine making, wherein an example annual budget for producing Merlot is disclosed.

Figure 5:
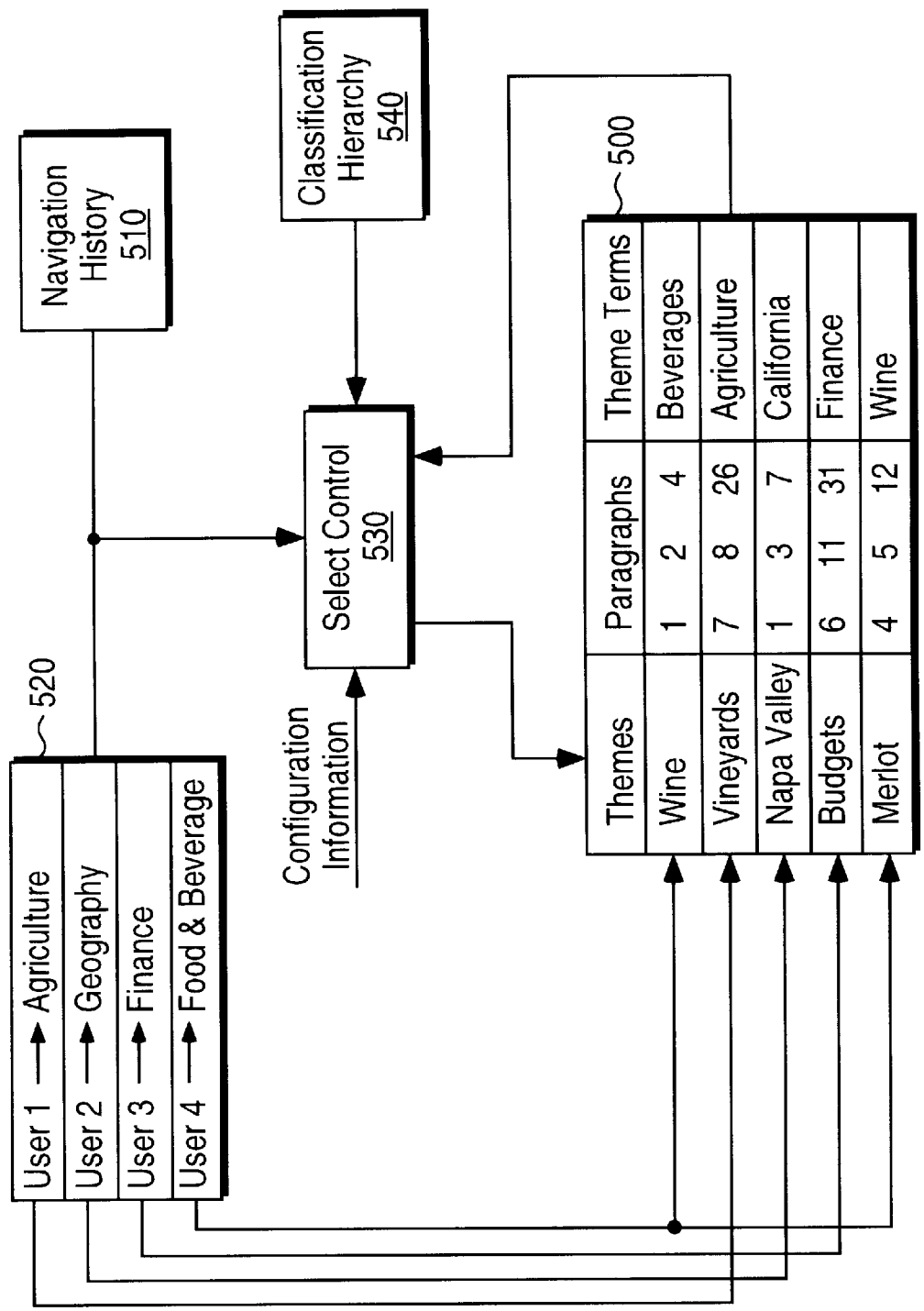
FIG. 5 is a block diagram illustrating the selection of a point of view gist for the example document on wine.

FIG. 5 is a block diagram illustrating the selection of a point of view gist for the example document on wine. As shown in FIG. 5, a point of view gist array 500 includes the most important themes extracted from the document about wine. Specifically, the most important document theme (e.g. document themes with the overall strongest rankings) is wine. The document theme, vineyards, is the second strongest topic in the content of the document, and Napa Valley is the third strongest theme document. Also, as shown in the point of view gist array 500 in FIG. 5, the document theme, budgets, is the fourth strongest document theme, and Merlot is the fifth strongest theme document.

During initial content processing, the paragraph thematic profile reflects analysis of each individual paragraph, and the document thematic profile reflects, in part, the most important themes of the document as listed in the point of view gist array 500. The point of view gist processing 120 (FIG. 1) analyzes the thematic profile 115, for both paragraphs and documents, and generates the point of view gists by compiling the point of view gist array 500. Specifically, as discussed above, the point of view gist processing selects the strongest paragraphs for each document theme identified. The paragraphs are listed in a sequential order in the point of view gist array 500.

The point of view gist array 500 also includes theme terms. The theme terms relate, either semantically or linguistically, to the themes, and are generally higher level concepts incorporating the concept of the themes. In one embodiment, the theme terms are leaf nodes or categories in the classification hierarchy (e.g. the knowledge catalog).

To view a point of view gist, a user, operating a document browsing system, invokes the point of view gist function for the example document on wine. In response, the point of view gist processing displays the point of view gist based on predetermined criteria. FIG. 5 includes block 510 that conceptually illustrates maintaining the navigation history of the user's operations in the document browsing system Also, user profile 520 identifies topics of interest for the user. A select control block 530, as part of the point of view gist processing, receives configuration information to identify either the navigation history or the user profile for the selection criteria. Both the navigation history 510 and user profile 520 contain categories from the classification hierarchy. The classification hierarchy block, labeled 540 in FIG. 5, identifies relevant portions of the knowledge catalog.

As shown in FIG. 5, the theme terms, conceptualized from the document themes, are linked to categories in the knowledge catalog. The select control 530 relates the categories or topics stored in the user profile 520 or navigation history 510 to a category in the knowledge catalog, and then maps the knowledge catalog category to a theme term. Thus, a relationship between high level topics, in either a navigation history or user profile, is mapped to specific themes identified in a document. Through use of a classification hierarchy, such as the knowledge catalog, general topics or concepts are related down to the theme terms, and then the document themes, to select a desired point of view gist.

For the wine document example, user 1 specifies a preference to view point of view gists with an agricultural slant. When the point of view gist function is invoked by user 1 for the wine document, the point of view gist on vineyards, which contains paragraphs 7, 8, and 26, is displayed. User 2 specifies, in the user profile 520, a slant in the area of geography, and therefore, when the point of view gist function is selected with user 2, the point of view gist for the document theme, Napa Valley, is displayed. The Napa Valley point of view gist includes paragraphs 1, 3 and 7. For user 3, who specified an interest in finance, the point of view gist on budgets, which contains paragraph 6, 11, and 31, is displayed in response to selection of the point of view gist for the wine document. A fourth user, who specified food and restaurants as an interest area, receives the point of view gist about wine or Merlot, in response to selection of the point of view gist function.

If two point of view gists relate to a common topic, then the most important point of view gist is selected (e.g. the point of view gist, which contains document themes that best describe the content of the document, is selected). In another embodiment, point of view gists, which relate to a common topic, are combined.

Generic Gists

The generic gists of the present invention are designed to replace documents so that a user may quickly extract the overall content of the document by reading a generic gist. As is described more fully below, the content of a generic gist is based on a process executed in the generic gist processing 140. The formula for the process is specified by the generic gist parameters 135. In contrast to the point of view gists, the generic gists are designed to permit a user to determine whether the user desires to read the entire document. For example, in one implementation for generic gists, the content processing system 100 may identify a single document theme that identifies what the document is primarily about. For this example, the generic gist processing 140 compiles a generic gist consisting of all paragraphs about the identified document theme.

As discussed above, the user specifies generic gist parameters 135 to dictate the content of generic gists. Alternatively, generic gists may be generated through default parameters. Based on the generic gist parameters 135, the generic gist processing 140 (FIG. 1) generates generic gists, on the fly, to effectively replace the content, which includes one or more themes, of a document.

In one embodiment, the generic gist parameters 135 include size and thematic content parameters. The size generic gist parameter specifies how many paragraphs to include in the generic gist. The size generic gist parameter may also be expressed as a percentage of the document. For example, the size generic gist parameter may limit the generic gist to fifty percent of the document. Using this parameter, the generic gist processing 140, after relevance ranking the paragraphs of a document, eliminates any paragraphs resulting in a generic gist larger than fifty percent of the original document.

In general, the thematic content generic gist parameter identifies the area of concentration for which the generic gist processing 140 selects paragraphs from a document. For example, a generic gist may consist of paragraphs about a single or individual document theme, or the generic gist may consist of multiple document themes. In addition, a thematic content generic gist parameter may identify a minimum theme strength for a paragraph before the paragraph is selected by the generic gist processing 140. For example, a generic gist may consist of cumulative theme strengths from a collection of document themes. The thematic content generic gist parameter may also specify the number of themes to include for compiling the generic gist. The thematic content generic gist parameter may further specify formulas for use by the generic gist processing 140. As discussed below, the formulas dictate how the generic gist processing 140 selects paragraphs to compile generic gists.

One formula for generating generic gists provides a global perspective of a document. For the global perspective embodiment, the generic gist processing 140 identifies, from the thematic profile 115, all paragraphs that contain content within the collective area. These paragraphs are then relevance ranked to select the best paragraphs containing information on the collective area. Based on the size generic gist parameter, a predetermined number of paragraphs or a percentage of paragraphs are compiled to generate a generic gist.

A second formula for generating generic gists selects the most important paragraphs regardless of the topic area or document theme. For this embodiment of generating generic gists, the generic gist processing 140 identifies paragraphs, from the thematic profile 115, that have the strongest theme strengths. The relative theme strengths may be measured from the individual paragraphs, as identified in the paragraph thematic profile (FIG. 3), or the theme strengths may be measured from the document as a whole, as identified in the document thematic profile 430 (FIG. 3). If the individual paragraph theme strengths are used, then the generic gist processing 140 compiles a generic gist by ordering paragraphs based on their corresponding theme strengths. The generic gist processing 140 then applies the size limitation. If the topics or themes are based on the document thematic profile, then the generic gist processing 140 orders paragraphs with the strongest theme strength that corresponds to the selected document themes. The generic gist processing 140 then applies the size limitation to potentially limit the number of paragraphs in the generic gist.

In another embodiment, the generic gist processing 140 utilizes a formula to generate generic gists based on a forced coverage policy. If a generic gist is generated based on the most important content (e.g. paragraphs are selected based on the strongest theme strengths of the paragraphs), then a generic gist may not include themes that have weaker theme strengths. To cover all themes identified in a document, the generic gist processing 140, when implementing the forced coverage policy, selects a paragraph from each document theme.

In one embodiment for implementing the forced coverage policy, the generic gist processing selects paragraphs that result in a minimal coverage of each of the document themes. Table 3 is an example of two paragraphs and their corresponding theme strengths for two different document themes.

TABLE 3

| Document Themes | P9  | P6  |
|-----------------|-----|-----|
| T1              | 200 | 0   |
| .               | .   | .   |
| .               | .   | .   |
| .               | .   | .   |
| T16             | 20  | 200 |

As shown in Table 3, paragraph 9 contains a theme strength of 200 for theme 1 and a theme strength of 20 for theme 16. Paragraph 6 has a theme strength of 200 for paragraph 16, but does not contain any content about theme 1 (e.g. has a zero theme strength for theme 1). In a minimal coverage policy, the generic gist processing 140 may select, for the example theme strengths of Table 3, paragraph 9 to cover both themes 1 and 16.

Another implementation for the forced coverage policy selects paragraphs based on the best coverage. For the example theme strengths of Table 3, the generic gist processing selects, to compile a generic gist having the best coverage of all the document themes, both paragraph 9 and paragraph 6. Even though theme 16 was covered in paragraph 9, the generic gist processing 140 selects paragraph 6 to include the best coverage of theme 16 in the generic gist.

A fourth policy for generating generic gists considers the distance of themes identified in the thematic profile. In general, for the distance policy, the generic gist processing 140 selects themes that best match the spread of the document. Table 4 below shows three example paragraphs and their corresponding theme strengths for two example themes (e.g. T1 and T2).

TABLE 4

| Document Themes | Document Theme Strengths | P1  | P2  | P3  |
|-----------------|--------------------------|-----|-----|-----|
| T1              | 100                      | 120 | 110 | 200 |
| T2              | 80                       | 60  | 70  | 160 |

For this example, the overall document theme strength for theme 1 (T1) is 100 and the overall document theme strength for theme 2 (T2) is 80. Thus, for these two themes, the content of the document contains a ratio of 100/80 of content of themes T1/T2. For the distance policy, the generic gist processing matches the spread of the document by selecting paragraphs that include a similar ratio of content. For the example data of Table 4, the generic gist processing 140 selects paragraph three (P3) because the contents of P3, a ratio of 200/160 for T1/T2, best matches the spread of content in the document as a whole.

In general, to generate a generic gist, the generic gist processing determines the content area, selects paragraphs within the content area, and limits, if necessary, the number of paragraphs based on the size generic gist parameter. To select an area, a user may specify a category in the knowledge catalog 150. Based on this category, the generic gist processing 140 selects paragraphs that have a corresponding document theme that maps to the category in the knowledge catalog 150, or categories beneath the selected category in the knowledge catalog 150. For example, if the user specifies the category "agriculture", then the document theme "vineyards", which is classified under the category agriculture, is contained in the generic gist.

A Document Browsing System

Figure 6:
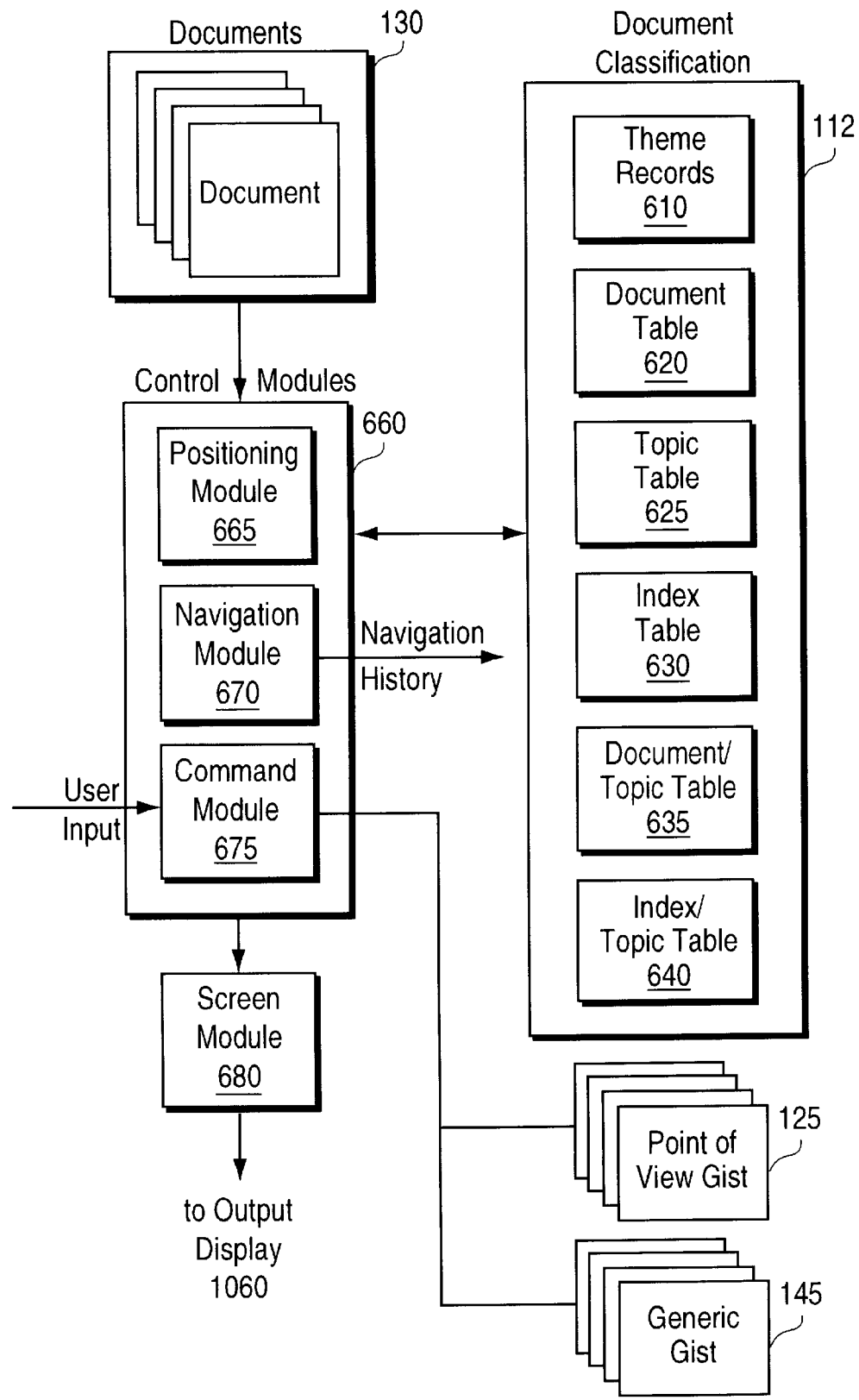
FIG. 6 is a block diagram illustrating one embodiment of a document browsing system that includes point of view gists.

As discussed above, point of view and generic gists have application for use in a document browsing system. FIG. 6 is a block diagram illustrating one embodiment of a document browsing system that includes point of view and generic gists. The document browsing system operates on the documents 130. The document browsing system uses document classification 112, generated from a content processing system, to display information about the documents. As shown in FIG. 6, the document browsing system includes control modules 660 for executing operations within the document browsing system. For this embodiment, the control modules 660 include a positioning module 665, a navigation module 670, and a command module 675. The control modules 660 receive, as inputs, the documents 130, user input, and document classification 112, and generate, as output, display information to an output display, such as a monitor on a computer system. Specifically, the positioning module 665 receives user input query information, and locates documents in the document browsing system relevant to the query. In response to the query, the positioning module 665 utilizes the document classification 112 to generate display information that reflects the general location in the classification hierarchy for which the specific information requested is located. The navigation module 670 receives user input, and generates, from the document classification 112, display information to permit a user to browse the categories of the classification hierarchy. Furthermore, the command module 675 generates display information to implement a plurality of action functions. For example, the command module 675 receives user input, which indicates selection of the point of view gist function, to select a point of view gist 125 in accordance with the criteria discussed above.

The document browsing system of FIG. 6 also includes a screen module 680. The screen module 680 receives display information from the control module 660, and generates specific graphical information for output to an output display (e.g. output display 1060 on FIG. 9). The specific operation of the screen module 680 is dependent upon the computer system and output display. The screen module 680 is intended to represent a broad category of output display drivers, which are well known in the art and will not be described further.

Figure 9:
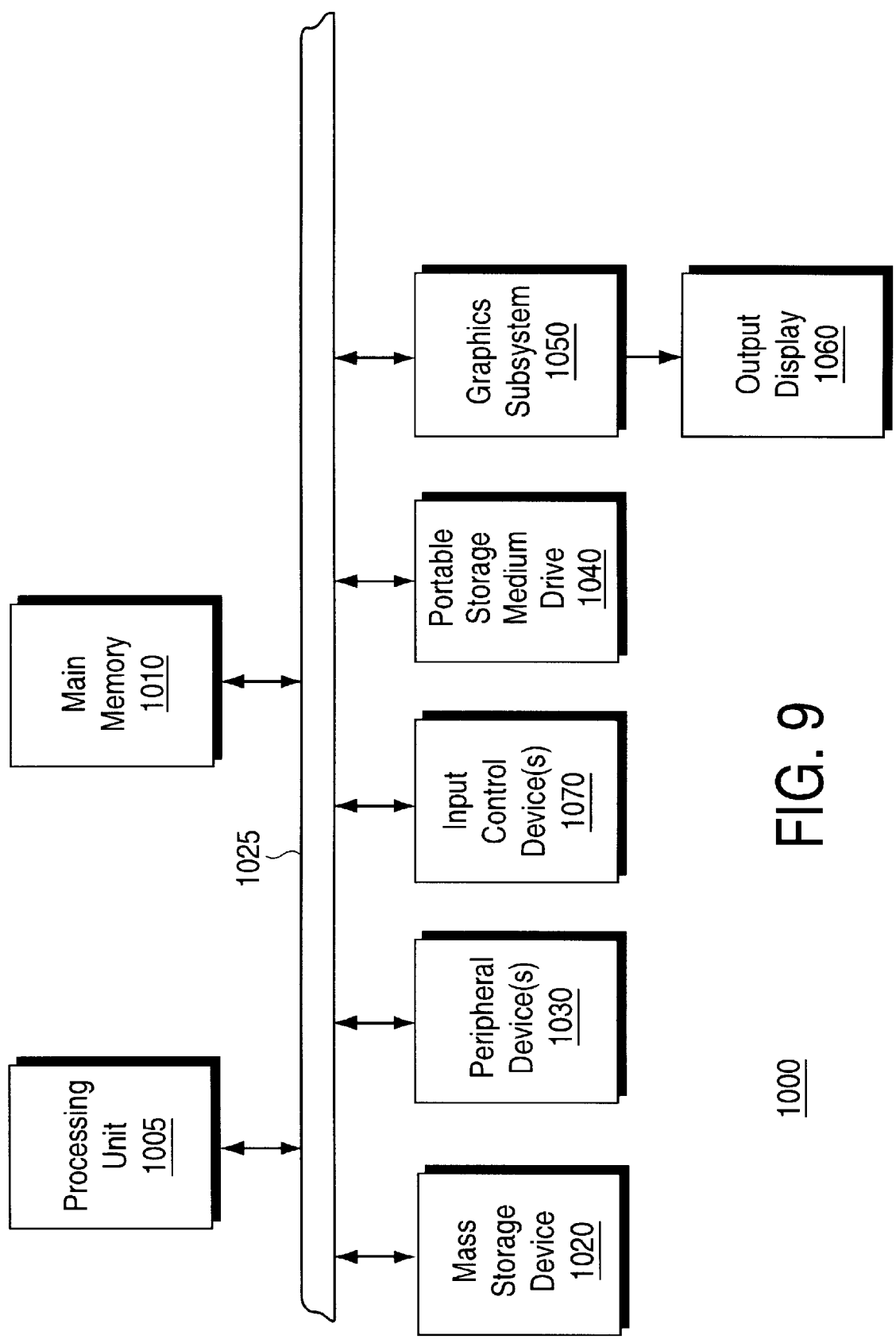
FIG. 9 illustrates a high level block diagram of a general purpose computer system in which the point of view gist processing software of the present invention may be implemented.

The document browsing system has access to the point of view gists 125 and the generic gists 145. In one embodiment, the point of view gists 125 are stored as point of view gist arrays (Table 2). The point of view gist arrays indicate the paragraphs that correspond to a particular point of view gist. The generic gists 145 are also stored as arrays that indicate the paragraphs corresponding to a generic gist. When a user invokes the point of view gist function from a display, including selecting a document, the information is input to the command module 675, shown as user input on FIG. 6. In response, the command module 675 accesses the point of view gist arrays corresponding to the selected document, and the selection module 530 selects the desired point of view gist array. Similarly, when a user invokes the generic gist function and selects a document, the information is input to the command module 675. The command module 675 then accesses the generic gist arrays corresponding to the selected document, and the selection module 530 selects the desired generic gist array based on the generic gist parameters 135. Also, the command module 675 accesses the identified paragraphs from the documents 130 for output to the screen module 680, and subsequently for display on the output display 1060 (FIG. 9).

Figure 7A:
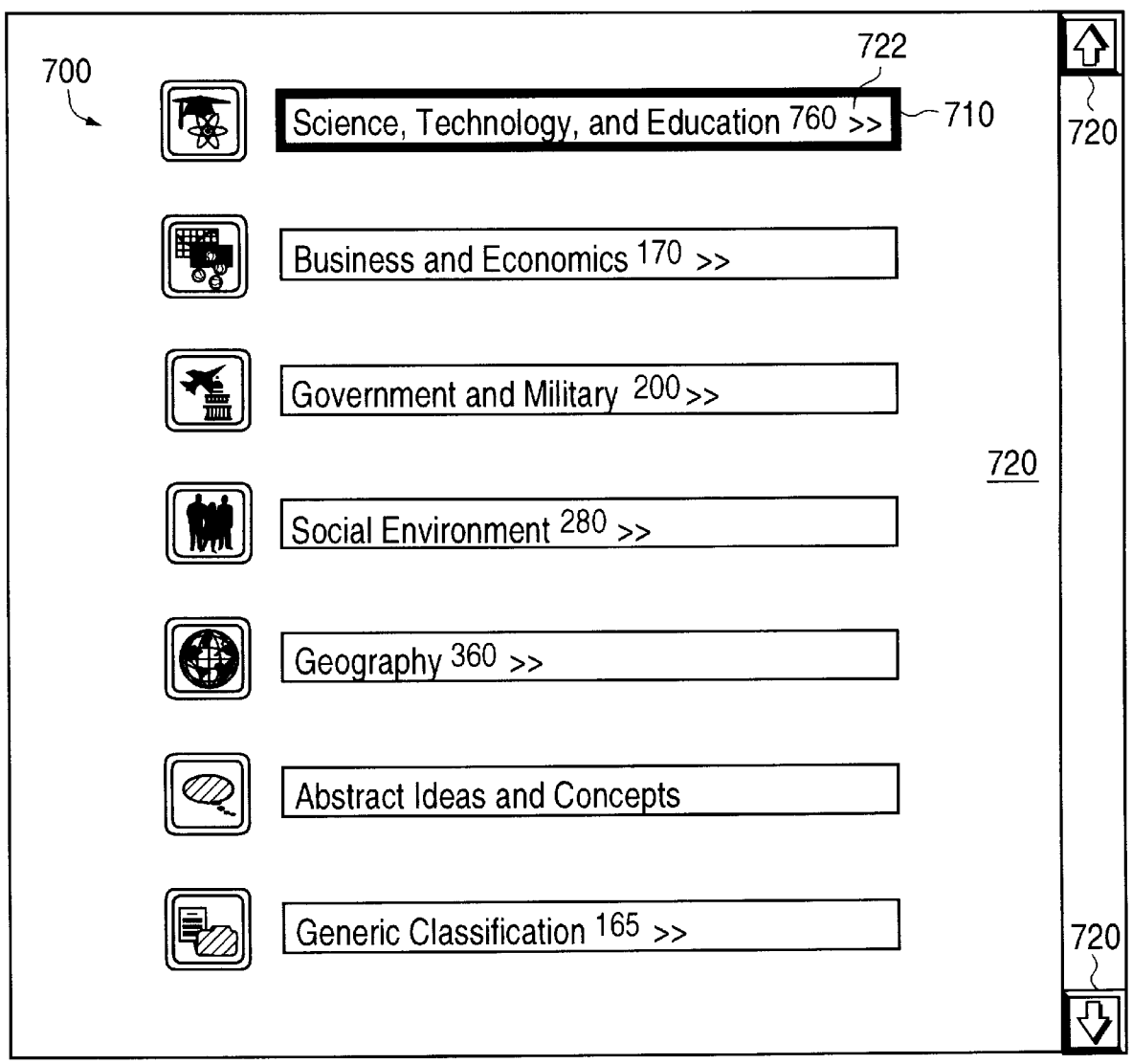
FIG. 7a illustrates an example home page or starting point for a document browsing system.

FIG. 7a illustrates an example home page or starting point for a document browsing system. The following example displays (FIGS. 7a–7f) illustrate navigating categories of a classification hierarchy to select a document for which the point of view gist function may be invoked. As shown in FIG. 7a, a display for the document browsing system includes a number of high level categories that are indicative of the topics contained in the documents 130. For this embodiment, the high level categories are derived from the knowledge catalog. As shown in FIG. 7a, each category name is displayed in a box, such as box 710 for the category (Science, Technology, and Education), for selection by a user. Within the box for a corresponding category, a number, such as the number "720" for the "Science, Technology, and Education" category, is displayed. The number indicates the number of documents classified for the category.

Furthermore, a symbol ">>", labeled 722 on FIG. 7a, is provided in the box to indicate that there are lower level categories arranged under the corresponding category.

Figure 7B:
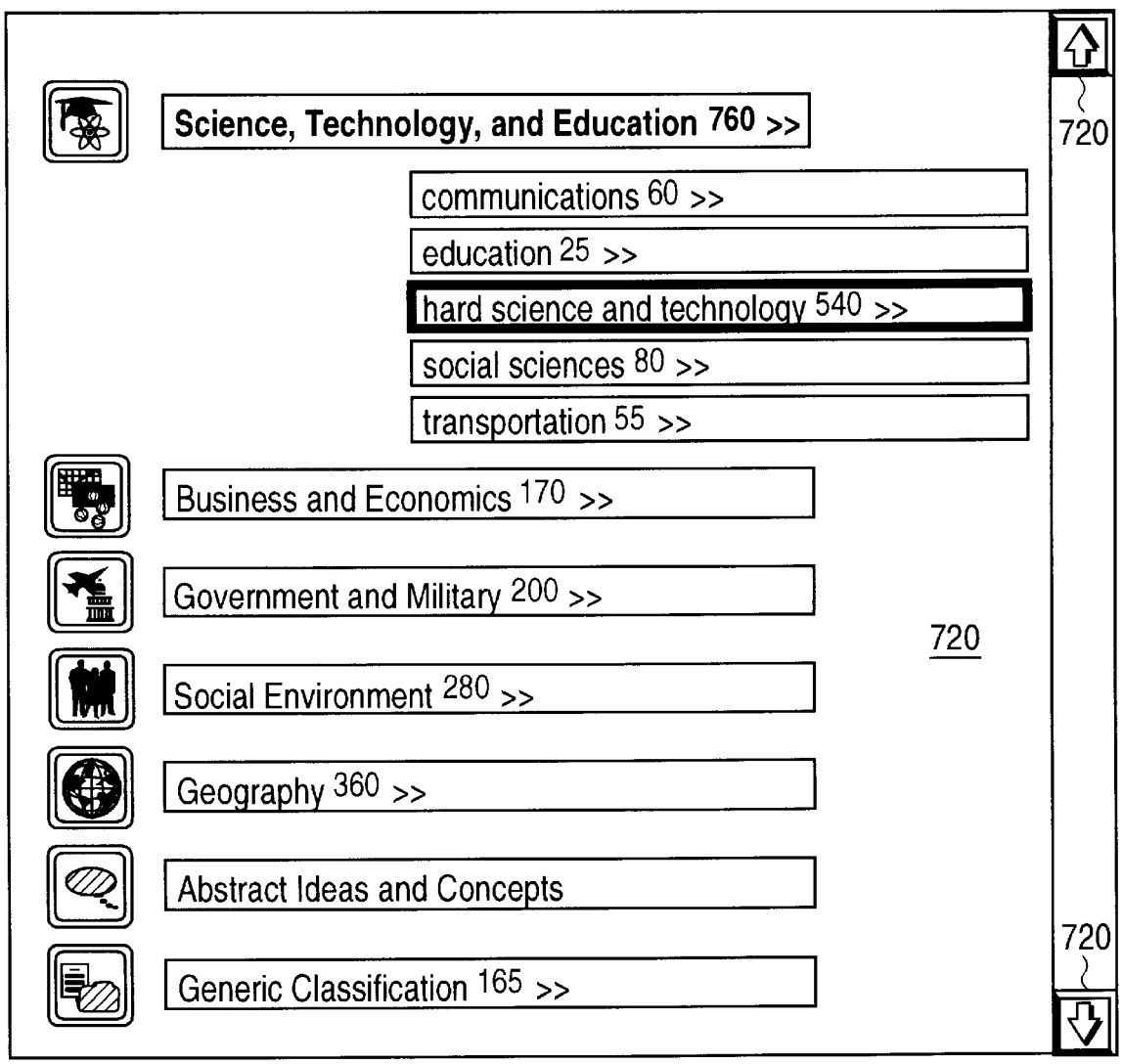
FIG. 7b illustrates expansion of the "Science, Technology, and Education" category into a number of categories arranged in a lower level of the classification hierarchy.
Figure 7C:
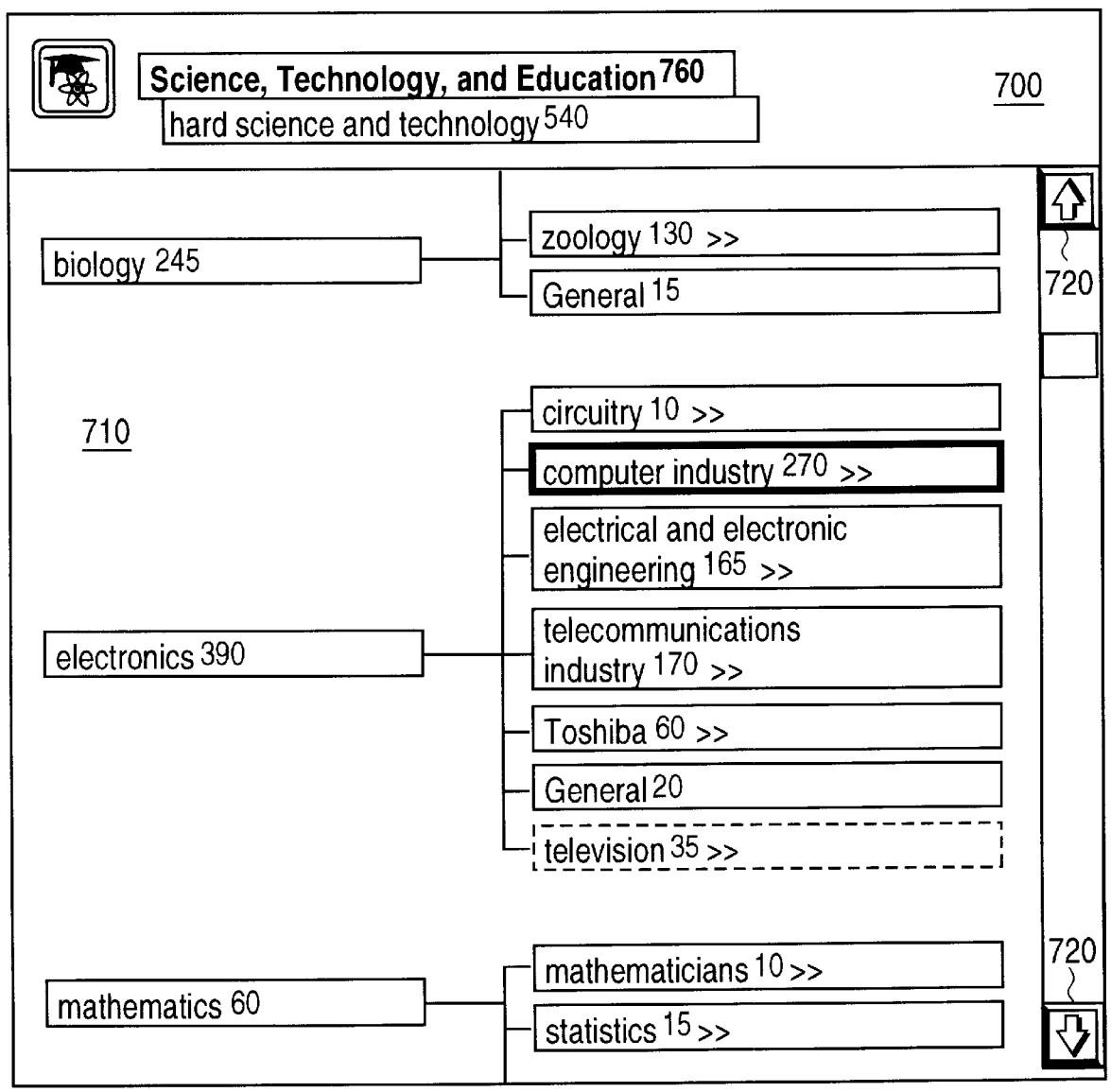
FIG. 7c illustrates a display on the document browsing system that expands the classification hierarchy.
Figure 7D:
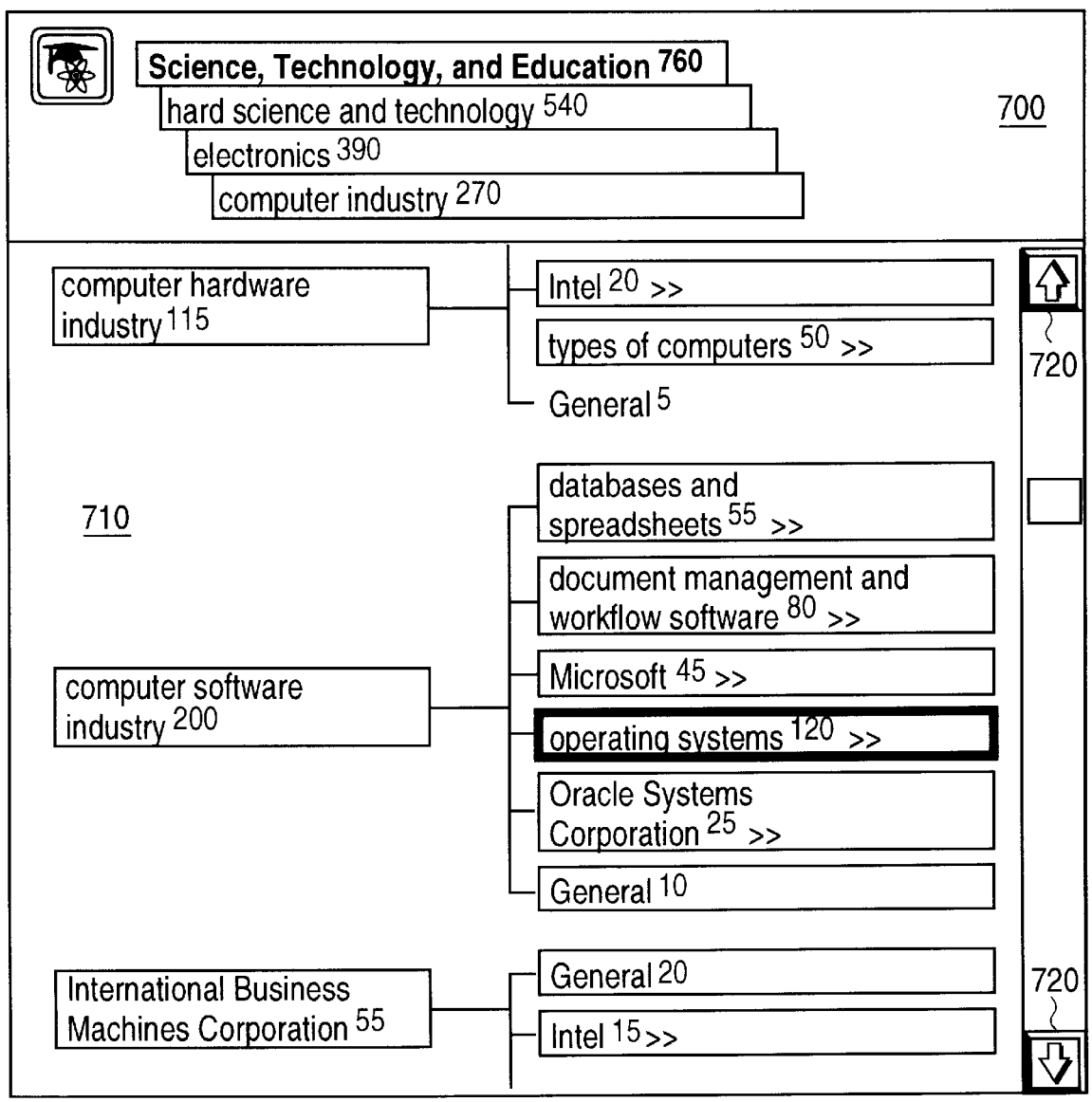
FIG. 7d illustrates a display on the document browsing system that further expands the classification hierarchy.
Figure 7E:
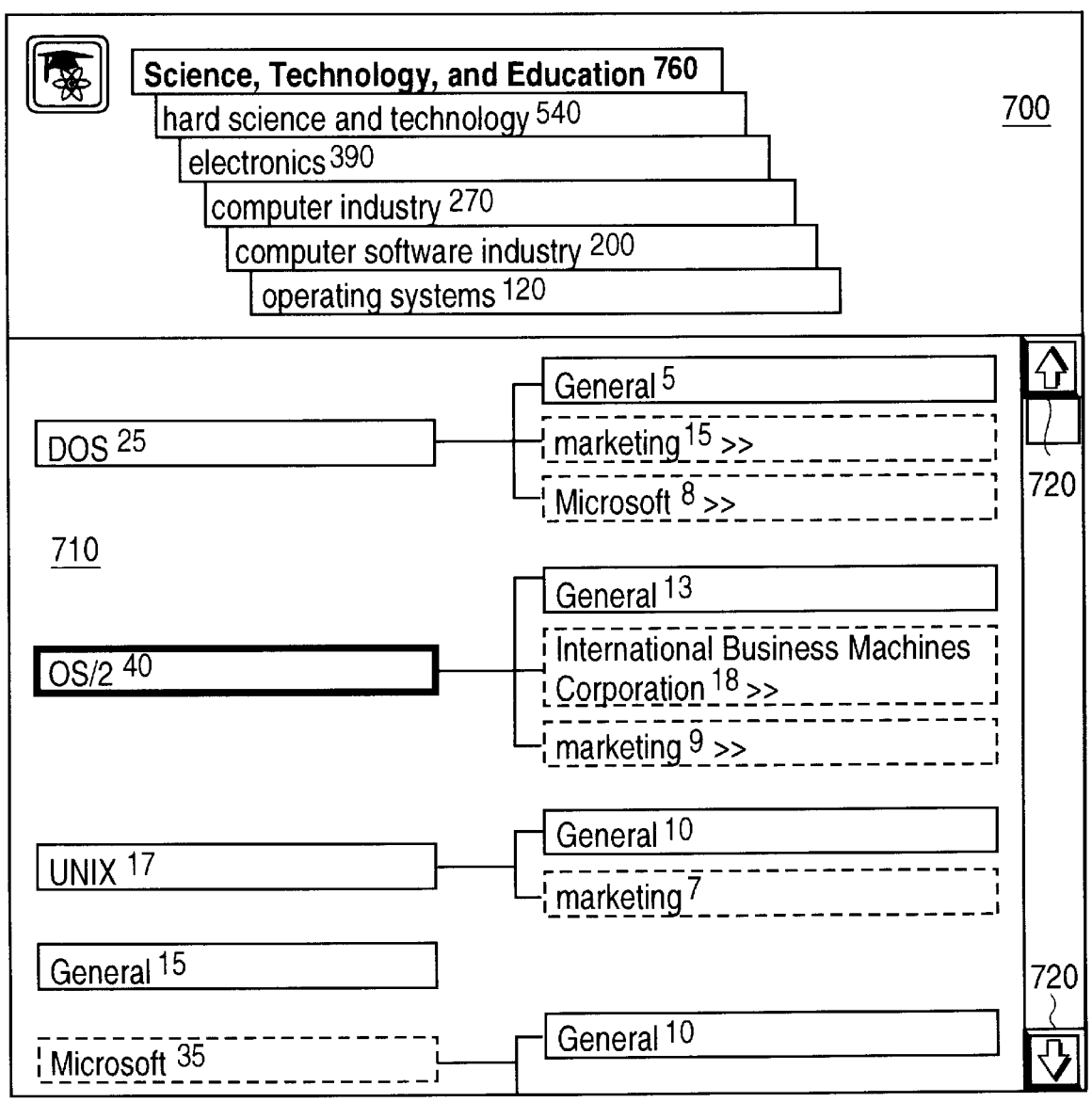
FIG. 7e illustrates a display on the document browsing system that further expands the classification hierarchy.

A user may browse the classification hierarchies to locate information via the document browsing system. FIG. 7b illustrates expansion of the "Science, Technology, and Education" category into a number of categories arranged in a lower level of the classification hierarchy. FIG. 7c illustrates a display on the document browsing system that further expands the classification hierarchy. For the example illustrated in FIG. 7c, the subcategory "Hard Science and Technology" was selected and expanded. The document browsing system displays the first page of the classification hierarchy for the parent node, "Hard Science and Technology." The classification hierarchy is displayed in a navigation/display section 710 and a history section 700. The navigation/display section 710 includes a scroll bar 320 to permit a user to scroll up and scroll down to view portions of the classification hierarchy arranged under the "Hard Science and Technology" category. When a category is selected for expansion, the category is added to the navigation history, and is displayed in the history section 700. FIGS. 7d and 7e illustrate expansion of the classification hierarchy from the display shown in FIG. 7c through a navigation history path that includes categories "electronics", "computer industry", "computer software industry", "operating systems", and "OS/2."

Figure 7F:
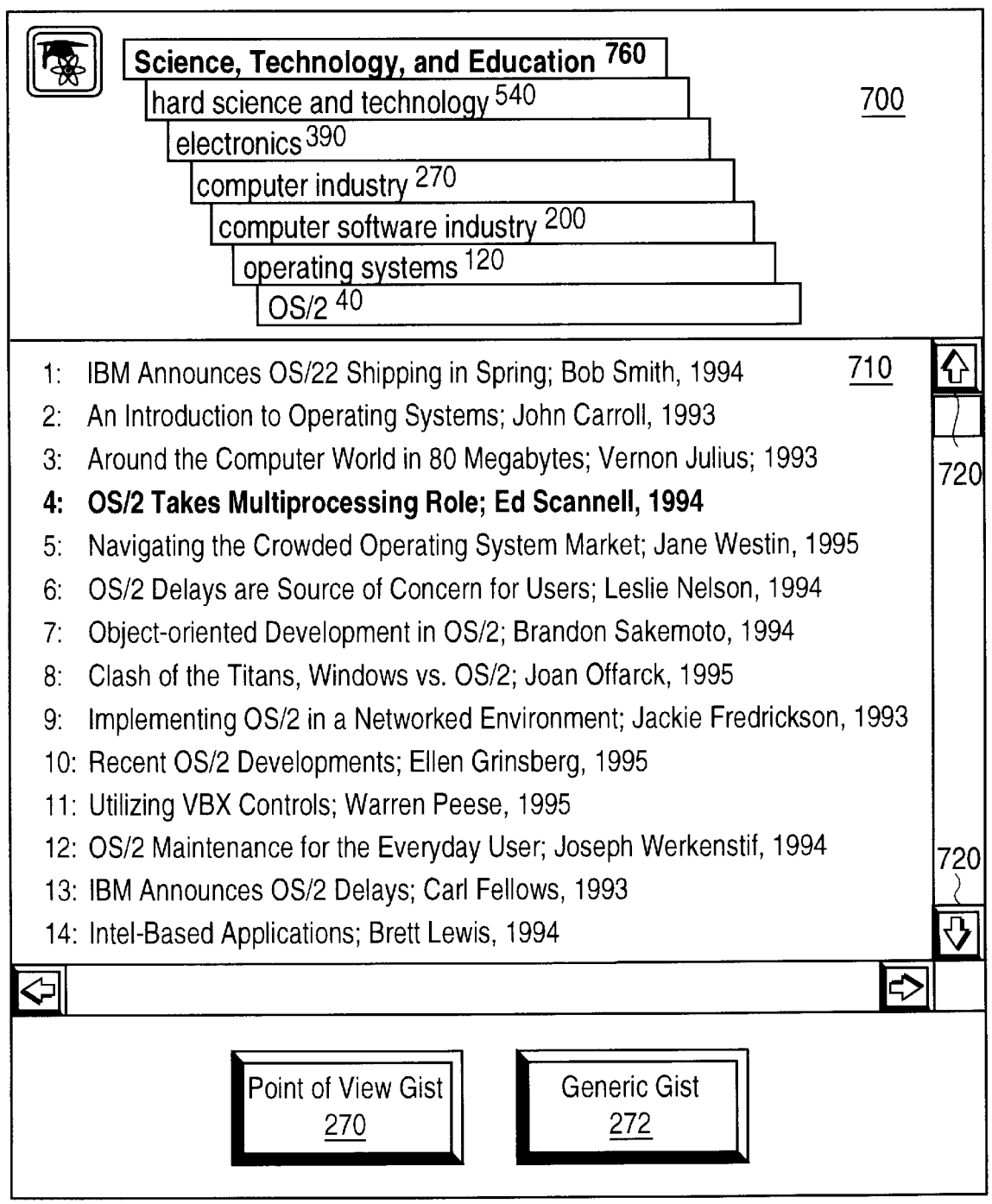
FIG. 7f illustrates an example display for a document browsing system that displays a list of documents from documents classified under the "OS/2" subcategory.

FIG. 7f illustrates an example display for a document browsing system that displays a list of documents from the documents 130 classified under the "OS/2" subcategory. The history section 700 displays a path of all the categories for which the user navigated to locate the corresponding set of documents. From the list of documents, a user may select a document to invoke the point of view gist function. For an example document browsing system that includes numerous functions for a document browsing system, see "Creating A Virtual Bookshelf", Appendix J of U.S. patent application Ser. No. 08/455,484, inventor Kelly Wical, entitled "Method and Apparatus for Determining Theme for Discourse"; filed May 31, 1995, which is herein expressly incorporated by reference.

The document browsing system display shown in FIG. 7f includes a point of view gist function button 270 and a generic gist function button 272. To invoke the point of view gist function, a user, via an input control device, such as a mouse, selects the point of view gist function button by placing the cursor over the button and double clicking on an appropriate mouse button. In response, the document browsing system displays a point of view gist, depending upon the configuration, based on either the navigation history or the user profiles. Similarly, to invoke the generic gist function, a user, via an input control device, selects the generic gist function button 272 by placing the cursor over the button and double clicking on an appropriate input control device button. In response, the document browsing system displays a generic gist based on the generic gist parameters 135.

Knowledge Catalog

As discussed above, a classification hierarchy is used to classify documents and to provide categories for navigation by a user. In one embodiment, the knowledge catalog is used as the classification hierarchy. The knowledge catalog provides a unique infrastructure to accurately represent concepts that define knowledge. The knowledge catalog includes a set of ontologies. The set of ontologies provide multiple views, characterizations, and organizations of concepts or categories. The static ontologies are parallel and independent of each other. The actual configuration, structure and orientation of a particular ontology is dependent upon the subject matter or field of the ontology. Thus, each ontology contains a different point of view.

The ontologies contained within the knowledge catalog are organized such that the categories are independent of language and culture. Some of the ontologies are not as much industries but rather concrete concepts. In the classification hierarchy, some categories provide factual information for the higher level or parent category, while other subcategories provide more richness to the parent category. For example, the term "computer program" provides more richness to the parent category "computer industry." However the term "California avocados" provides factual information for the parent category "avocados" by representing that the avocados are from California.

Some ontologies represent concepts that have concrete definitions, but may be applicable to one or more specific industries or categories (e.g. the terms are generic). For example, the word "plant", when used to describe a manufacturing plant, is a concrete term that applies to many industries. Other ontologies contain representations of words that are not concrete, but rather describe abstract concepts. For example, the concepts of "knowledge" and "methods" do not describe material items, but are "abstract" concepts.

The knowledge catalog 150 includes categories arranged beneath high level categories, in an up/down direction, as well as categories arranged on the same level of the classification hierarchy, in a right/left direction. For example, the categories "business and industry" and "economics" are located under a parent category "business and economics" because the "business and industry" and "economics" categories are concepts, more detailed than the parent category, that relate semantically to the parent category, "business and economics." Also, categories located on the same level of the classification hierarchy are categories that represent concepts in a similar level of detail in relationship to a parent category. For example, the categories "business and industry" and "economics" have a similar relationship to the parent category "business and economics."

The categories in the knowledge catalog may be semantic derivatives and/or lexical derivatives of the parent category. For example, a branch of the classification hierarchy may associate a "house" with articles placed within a house, such as dining room tables, chairs, bedroom furniture, etc. For this example, a classification hierarchy that includes semantic derivative concepts based on the "house" concept is desirable. However, for a purely lexical classification hierarchy, the house "concept" may include types of houses, such as a ranch style house, a contemporary house, etc, Although a document browsing system, for use with the point of view gists, uses a classification hierarchy arranged semantically/lexically, any classification hierarchy may be used without deviating from the spirit and scope of the invention. A hierarchical arrangement of categories in accordance with one embodiment of a knowledge catalog is contained in Appendix A of U.S. patent application Ser. No. 08/455,484, inventor Kelly Wical, entitled "Method and Apparatus for Determining Theme for Discourse", filed May 31, 1995.

A Content Processing System

Figure 8:
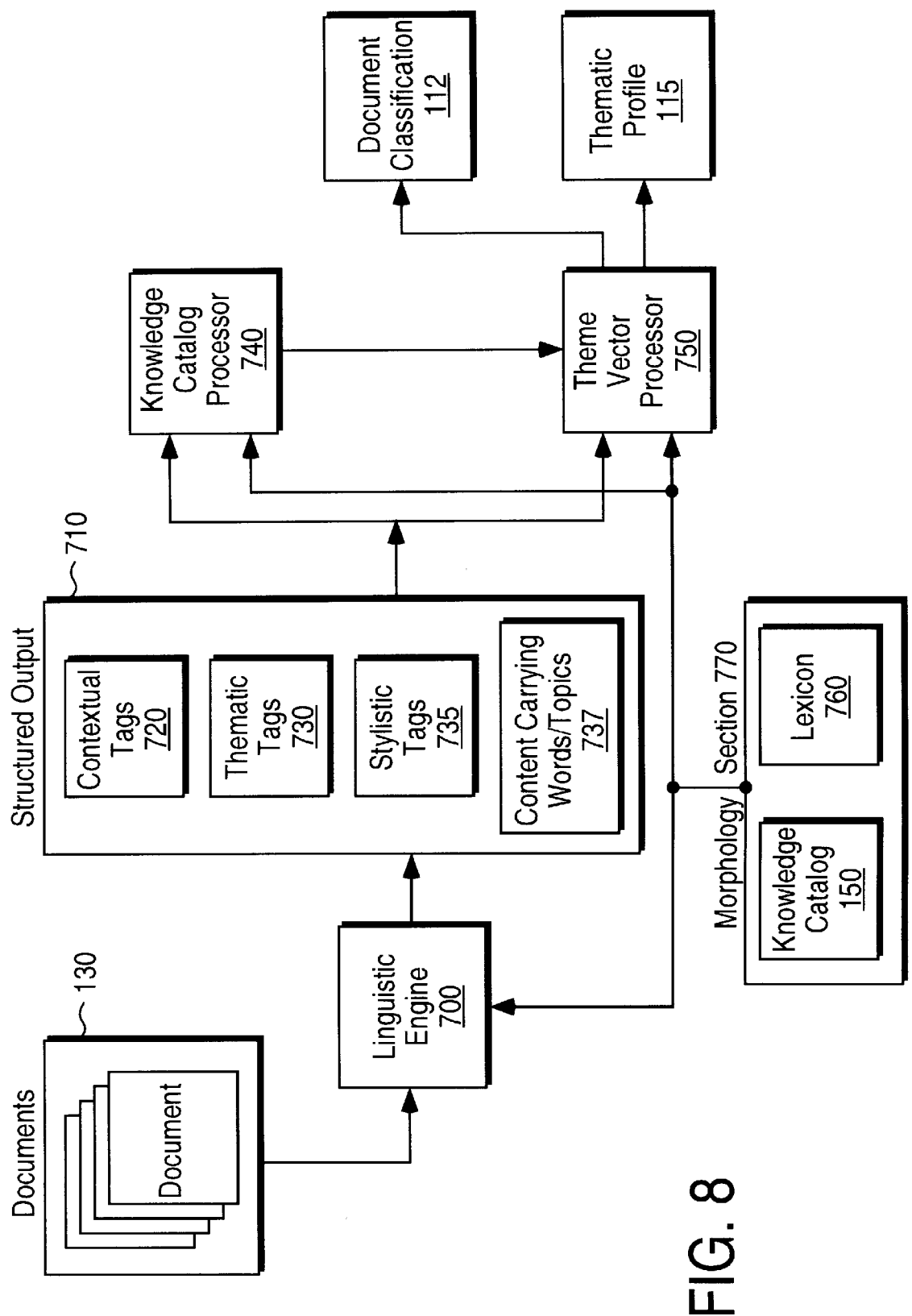
FIG. 8 is a block diagram illustrating one embodiment for a content processing system.

FIG. 8 is a block diagram illustrating one embodiment for a content processing system. In general, the content processing system analyzes the document set 130 and generates the thematic profile 115 for use by the point of view processing 120 and generic gist processing 145. For this embodiment, the content processing system includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. patent application Ser. No. 08/455, 484, inventor Kelly Wical, entitled "Method and Apparatus for Determining Theme for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phrases for each sentence in the documents, the context of the documents is defined. The chaos loop process stores information in the form of the contextual tags 720. U.S. patent application Ser. No. 08/455,484, inventor Kelly Wical, entitled "Method and Apparatus for Determining Theme for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. patent application Ser. No. 08/455,484, inventor Kelly Wical, entitled "Method and Apparatus for Determining Theme for Discourse", filed May 31, 1995.

As shown in FIG. 8, the morphology section 770 contains the knowledge catalog 150 and a lexicon 760. In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B; entitled "Lexicon Documentation", of U.S. patent application Ser. No. 08/455,484, inventor Kelly Wical, entitled "Method and Apparatus for Determining Theme for Discourse", filed May 31, 1995.

The topics and content carrying words 737 are input to the knowledge catalog processor 740. In part, the knowledge catalog processor 740 processes the content carrying words for direct use with the knowledge catalog 150. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 8, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 240 are converted to the noun or nominal form. In general, the theme vector processor 750 presents a thematic profile of the content of each document (e.g. generates the thematic profile 115) and classified documents in the knowledge catalog 150 (e.g. generates the document classification 112). To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

The thematic profile 115 includes records that provide information about the content of the document set 130. The thematic profile 115 includes, in part, theme records, a document table, a topic table, and a document/topic table. The theme records 155 contain thematic information including the identification of the most important themes from each document (e.g. the document themes). The document table contains information about the set of documents 130 including document level theme and statistical information. The topic table includes a hierarchy of topics or categories for the entire set of documents 130. Specifically, the topics, stored in the topic table, are based on themes extracted from the documents 130. The extracted themes or topics are then mapped to categories in the knowledge catalog to generate the topic table. The document/topic table contains a cross reference between the documents 130 and the topics stored in the topic table.

As discussed above, each theme identified in the thematic profile 115 is assigned a normalized or relative theme strength. The normalized theme strength is calculated using the theme strengths of each theme term in the text that contributes to the particular theme. At the sentence level, the theme vector processor 750 calculates a theme strength for each content carrying word in the sentence. The theme strength of the word measures the thematic weight of the word within the context of the sentence in which it appears. Prior to processing, each content carrying word receives a default theme strength that varies depending upon the word. As the theme vector processor 750 analyzes the surrounding text in the sentence to determine the thematic role of the word, it increases or decreases the theme strength for the word. For example, a theme grading determines how each word in a sentence is functioning within the context and structure of the sentence. The theme grading assigned to a word affects the theme strength for the word.

In one embodiment, the theme vector processor 750 executes a plurality of heuristic routines to generate the theme strengths for each theme. U.S. patent application Ser. No. 08/455,484, inventor Kelly Wical, entitled "Method and Apparatus for Determining Theme for Discourse", contains source code to generate the theme strengths in accordance with one embodiment for theme vector processing. The source code includes detailed comments to explain the operation of the code. Although the generation of the theme strengths is disclosed as computer source code, the theme strengths may be generated by any means, such as a hardware implementation, without deviating from the spirit or scope of the invention. Also, a further explanation of generating a thematic profile is contained in U.S. patent application Ser. No. 08/455,484, inventor Kelly Wical, entitled "Method and Apparatus for Determining Theme for Discourse", filed May 31, 1995, which is herein incorporated by reference.

Computer System

FIG. 9 illustrates a high level block diagram of a general purpose computer system in which the point of view processing software of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the point of view processing system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 9 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the point of view processing software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the point of view processing software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the point of view processing.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The point of view processing may be implemented in either hardware or software. For the preferred software implementation, the point of view processing is software that includes a plurality of computer executable instructions for implementation on a general purpose computer system. Prior to loading into a general purpose computer system, the point of view processing software may reside as encoded information on a computer readable medium, such as a magnetic floppy disk, magnetic tape, and compact disc read only memory (CD-ROM). In one hardware implementation, circuits may be developed to perform the functions described herein. The knowledge catalog 150 may be implemented as a database stored in memory.

Although the present invention has been described in terms of specific exemplary embodiments, it will be appreciated that various modifications and alterations might be made by those skilled in the art without departing from the spirit and scope of the invention.

What is claimed is:

1. A method for generating a point of view gist from a document comprising the steps of:

receiving at least one document comprising a plurality of paragraphs;

generating a thematic profile for the document that includes an identification of a plurality of document themes, wherein the document themes define a plurality of subject matter areas covered by the document;

analyzing the document to identify one or more paragraphs from the document most relevant to a theme in the thematic profile for the document; and generating at least one point of view gist for the document with a slant toward the theme by selecting at least one of the paragraphs identified.

2. The method as set forth in claim 1, further comprising the step of displaying, in response to user input, the point of view gist for the document including the steps of:

receiving, as input from a user, at least one topic that defines a general subject matter of interest;

selecting, from the at least one point of view gist generated, a point of view gist that includes a document theme relating to the at least one topic; and displaying, in response to user input, the point of view gist selected.

3. The method as set forth in claim 2, wherein the step of selecting a point of view gist comprises the steps of:

mapping the topic to a classification hierarchy; and mapping the document themes to the classification hierarchy to provide a link between the topics specified by the user, and the document theme of the point of view gist.

4. The method as set forth in claim 1, further comprising the steps of:

storing a classification hierarchy comprising a plurality of categories;

classifying at least one document in one or more of the categories;

displaying, in response to user input, a portion of the classification hierarchy that includes categories for which at least one document has been classified to permit navigation of the classification hierarchy by the user; and displaying, in response to user input, a point of view gist that includes a document theme classified under a category within the portion of the classification hierarchy navigated by the user.

5. The method as set forth in claim 1, wherein:

the step of analyzing the document to identify one or more paragraphs from the document comprises the step of generating a paragraph thematic profile for the document to identify one or more paragraph themes for each paragraph; and the step of generating at least one point of view gist comprises the step of relevance ranking the paragraphs that contain a paragraph theme corresponding to the document theme of the point of view gist.

6. The method as set forth in claim 5, wherein: the step of generating a paragraph thematic profile comprises the steps of:

generating a theme strength for each paragraph theme in each paragraph;

gene rating a theme capacity for each paragraph that measures content value;

the step of relevance ranking paragraphs comprises the step of utilizing the theme strength and the theme capacity to identify paragraphs that have the most relevant content for a corresponding document theme.

7. A method for presenting information about a document in a document browsing system comprising the steps of:

receiving input from a user to specify a topic of interest;

accessing a repository of documents, wherein a document comprises a plurality of themes that define a plurality of subject matter areas covered by the document;

storing a plurality of point of view gists for the repository of documents, wherein a point of view gist comprises at least one paragraph from the document most relevant to a theme for the document; and displaying, in response to user request, a point of view gist for a document that includes one theme related to the topic of interest.

8. A method for generating a generic gist from a document comprising the steps of:

receiving at least one document comprising a plurality of paragraphs;

generating a thematic profile for a document that includes an identification of a plurality of document themes, wherein the document themes define a plurality of subject matter areas covered by the document;

analyzing said document to identify a plurality of paragraphs from the document most relevant to a plurality of themes in the thematic profile for the document; and generating at least one generic gist for the document by selecting the paragraphs identified, wherein the generic gist includes a plurality of paragraphs from the document that include content relating to at least two document themes.

9. The method as set forth in claim 8, further comprising the step of receiving user input that specifies generic gist parameters including size and thematic content.

10. The method as set forth in claim 8, wherein the step of generating at least one generic gist for the document comprises the step of selecting one or more paragraphs that include different document themes to provide a global perspective of the content of the document.

11. The method as set forth in claim 8, wherein the step of generating at least one generic gist for the document comprises the step of selecting one or more of the most important paragraphs.

12. The method as set forth in claim 8, wherein the step of generating at least one generic gist for the document comprises the step of selecting a paragraph that contains content for each document theme identified.

13. The method as set forth in claim 8, wherein the step of generating at least one generic gist for the document comprises the step of selecting a paragraphs that contains content to reflect the overall content of the document.

14. A computer readable medium having a set of instructions stored therein, which when executed by a computer, causes the computer to perform the steps of:

receiving at least one document comprising a plurality of paragraphs;

generating a thematic profile for the document that includes an identification of a plurality of document themes, wherein the document themes define a plurality of subject matter areas covered by the document;

analyzing said document to identify one or more paragraphs from the document most relevant to a theme in the thematic profile for the document; and generating at least one point of view gist for the document with a slant toward the theme by selecting at least one of the paragraphs identified.

15. The computer readable medium as set forth in claim 14, further comprising instructions for displaying, in response to user input, the point of view gist for the document including instructions for:

receiving, as input from a user, at least one topic that defines a general subject matter of interest;

selecting, from the at least one point of view gist generated, a point of view gist that includes a document theme relating to the at least one topic; and displaying, in response to user input, the point of view gist selected.

16. The computer readable medium as set forth in claim 15, wherein the instructions for selecting a point of view gist comprises instructions for:

mapping the topic to a classification hierarchy; and mapping the document themes to the classification hierarchy to provide a link between the topic, specified by the user, and the document theme of the point of view gist.

17. The computer readable medium as set forth in claim 14, further comprising instructions for:

storing a classification hierarchy comprising a plurality of categories;

classifying at least one document in one or more of the categories;

displaying, in response to user input, a portion of the classification hierarchy that includes categories for which at least one document has been classified to permit navigation of the classification hierarchy by the user; and displaying, in response to user input, a point of view gist that includes a document theme classified under a category within the portion of the classification hierarchy navigated by the user.

18. The computer readable medium as set forth in claim 14, wherein:

instructions for analyzing the document to identify one or more paragraphs from the document comprises instructions for generating a paragraph thematic profile for the document to identify one or more paragraph themes for each paragraph; and instructions for generating at least one point of view gist comprises instructions for relevance ranking the paragraphs that contain a paragraph theme corresponding to the document theme of the point of view gist.

19. The computer readable medium as set forth in claim 18, wherein:

instructions for generating a paragraph thematic profile comprises instructions for:

generating a theme strength for each paragraph theme in each paragraph;

generating a theme capacity for each paragraph that measures content value;

instructions for relevance ranking paragraphs comprises instructions for utilizing the theme strength and the theme capacity to identify paragraphs that have the most relevant content for a corresponding document theme.

20. A computer readable medium having a set of instructions stored therein, which when executed by a computer, causes the computer to perform the steps of:

receiving input from a user to specify a topic of interest;

accessing a repository of documents, wherein a document comprises a plurality of themes that define a plurality of subject matter areas covered by the document;

storing a plurality of point of view gists for the repository of documents, wherein a point of view gist comprises at least one paragraph from the document most relevant to a theme for the document, and displaying, in response to user request, a point of view gist for a document that includes one theme related to the topic of interest.

21. A document browsing system comprising:

memory for storing a repository of documents, wherein a document comprises a plurality of themes that define a plurality of subject matter areas covered by the document and for storing at least one point of view gist for the document, wherein a point of view gist comprises at least one paragraph from the document most relevant to a theme for the document;

an input control device for receiving input from a user to specify a topic of interest;

an output display for displaying information about documents; and a processing unit, coupled to said input control device and said output display for displaying, in response to user input from said input control device, a point of view gist for a document that includes one theme related to the topic of interest.

* * * * *